US011489857B2

(12) United States Patent
Hegli et al.

(10) Patent No.: US 11,489,857 B2
(45) Date of Patent: *Nov. 1, 2022

(54) SYSTEM AND METHOD FOR DEVELOPING A RISK PROFILE FOR AN INTERNET RESOURCE

(71) Applicant: Webroot Inc., Broomfield, CO (US)

(72) Inventors: Ron Hegli, San Diego, CA (US); Hal Lonas, Carlsbad, CA (US); Christopher K. Harris, San Diego, CA (US)

(73) Assignee: Webroot Inc., Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/888,341

(22) Filed: May 6, 2013

(65) Prior Publication Data
US 2014/0330759 A1      Nov. 6, 2014

Related U.S. Application Data

(63) Continuation of application No. 12/709,504, filed on Feb. 21, 2010, now Pat. No. 8,438,386.
(Continued)

(51) Int. Cl.
*G06N 20/00*        (2019.01)
*H04L 9/40*         (2022.01)

(52) U.S. Cl.
CPC ......... *H04L 63/1425* (2013.01); *G06N 20/00* (2019.01)

(58) Field of Classification Search
None
See application file for complete search history.

(56) References Cited

U.S. PATENT DOCUMENTS

| 5,278,901 A | 1/1994 | Shieh et al. |
| 5,442,669 A | 8/1995 | Medin |

(Continued)

FOREIGN PATENT DOCUMENTS

| EP | 1315066 | 5/2003 |
| JP | JP 2007-122692 | 5/2007 |

(Continued)

OTHER PUBLICATIONS

Jebara, Tony "Multi-Task Feature and Kernel Selection for SVMs" 21st International Conference on Machine Learning Banff, Canada 2004 [Online] Downloaded Feb. 8, 2015http://delivery.acm.org/10.1145/1020000/1015426/p329-jebara.pdf?ip=151.207.250.51&id=1015426&acc=ACTIVE%20SERVICE&key=C15944E53D0ACA63%2E4D4702B0C3E38B35%2E4D4702B0C3E38B35%2E4D4702B0C3E38B.*

(Continued)

*Primary Examiner* — Ben M Rifkin
(74) *Attorney, Agent, or Firm* — Sprinkle IP Law Group

(57) ABSTRACT

A method and system for controlling access to an Internet resource is disclosed herein. When a request for an Internet resource, such as a Web site, is transmitted by an end-user of a LAN, a security appliance for the LAN analyzes a reputation index for the Internet resource before transmitting the request over the Internet. The reputation index is based on a reputation vector which includes a plurality of factors for the Internet resource such as country of domain registration, country of service hosting, country of an internet protocol address block, age of a domain registration, popularity rank, internet protocol address, number of hosts, to-level domain, a plurality of run-time behaviors, JavaScript block count, picture count, immediate redirect and response latency. If the reputation index for the Internet resource is at or above a threshold value established for the (Continued)

LAN, then access to the Internet resource is permitted. If the reputation index for the Internet resource is below a threshold value established for the LAN, then access to the Internet resource is denied.

29 Claims, 11 Drawing Sheets

Related U.S. Application Data

(60) Provisional application No. 61/241,389, filed on Sep. 10, 2009, provisional application No. 61/171,264, filed on Apr. 21, 2009.

(56) References Cited

U.S. PATENT DOCUMENTS

| | | | |
|---|---|---|---|
| 5,485,575 A | 1/1996 | Chess et al. | |
| 5,537,540 A | 7/1996 | Miller et al. | |
| 5,621,889 A | 4/1997 | Lermuzeaux et al. | |
| 5,623,600 A | 4/1997 | Ji et al. | |
| 5,684,875 A | 11/1997 | Ellenberger | |
| 5,696,822 A | 12/1997 | Nachenberg | |
| 5,715,455 A | 2/1998 | Macon et al. | |
| 5,765,030 A | 6/1998 | Nachenberg et al. | |
| 5,796,825 A | 8/1998 | McDonnal et al. | |
| 5,802,275 A | 9/1998 | Blonder | |
| 5,809,138 A | 9/1998 | Netiv | |
| 5,826,013 A | 10/1998 | Nachenberg | |
| 5,920,696 A | 7/1999 | Brandt et al. | |
| 5,930,467 A | 7/1999 | Morita | |
| 5,930,828 A | 7/1999 | Jensen et al. | |
| 5,951,698 A | 9/1999 | Chen et al. | |
| 5,974,549 A | 10/1999 | Golan | |
| 5,987,611 A | 11/1999 | Freund | |
| 5,996,011 A * | 11/1999 | Humes | H04L 29/06 709/225 |
| 6,006,328 A | 12/1999 | Drake | |
| 6,009,520 A | 12/1999 | Gharda | |
| 6,047,319 A | 4/2000 | Olson | |
| 6,069,628 A | 5/2000 | Farry et al. | |
| 6,070,174 A | 5/2000 | Starek et al. | |
| 6,073,241 A | 6/2000 | Rosenberg et al. | |
| 6,092,194 A | 7/2000 | Touboul | |
| 6,118,705 A | 9/2000 | Gupta et al. | |
| 6,141,698 A | 10/2000 | Krishnan et al. | |
| 6,154,844 A | 11/2000 | Touboul | |
| 6,167,520 A | 12/2000 | Touboul | |
| 6,173,291 B1 | 1/2001 | Jenevein | |
| 6,192,512 B1 | 2/2001 | Chess | |
| 6,208,999 B1 | 3/2001 | Spilo et al. | |
| 6,240,530 B1 | 5/2001 | Togawa | |
| 6,253,258 B1 | 6/2001 | Cohen | |
| 6,272,641 B1 | 8/2001 | Ji | |
| 6,310,630 B1 | 10/2001 | Kulkarni et al. | |
| 6,347,375 B1 | 2/2002 | Reinert | |
| 6,357,008 B1 | 3/2002 | Nachenberg | |
| 6,374,363 B1 | 4/2002 | Wu et al. | |
| 6,397,264 B1 | 5/2002 | Stasnick et al. | |
| 6,397,311 B1 | 5/2002 | Capps | |
| 6,401,210 B1 | 6/2002 | Templeton | |
| 6,405,316 B1 | 6/2002 | Krishnan et al. | |
| 6,412,071 B1 | 6/2002 | Hollander | |
| 6,430,561 B1 | 8/2002 | Austel et al. | |
| 6,457,174 B1 | 9/2002 | Kuroda et al. | |
| 6,460,060 B1 | 10/2002 | Maddalozzo, Jr. et al. | |
| 6,473,406 B1 | 10/2002 | Coile et al. | |
| 6,480,962 B1 | 11/2002 | Touboul | |
| 6,487,601 B1 | 11/2002 | Hubacher et al. | |
| 6,496,913 B1 | 12/2002 | Taugher | |
| 6,535,229 B1 | 3/2003 | Kraft | |
| 6,535,931 B1 | 3/2003 | Celi, Jr. | |
| 6,606,659 B1 | 8/2003 | Hegli et al. | |
| 6,611,878 B2 | 8/2003 | De Armas et al. | |
| 6,633,835 B1 | 10/2003 | Moran et al. | |
| 6,667,751 B1 | 12/2003 | Wynn et al. | |
| 6,681,972 B1 | 1/2004 | Tapocik | |
| 6,701,441 B1 | 3/2004 | Balasubramaniam et al. | |
| 6,721,721 B1 | 4/2004 | Bates et al. | |
| 6,735,703 B1 | 5/2004 | Kilpatrick et al. | |
| 6,772,345 B1 | 8/2004 | Shetty | |
| 6,775,780 B1 | 8/2004 | Muttik | |
| 6,785,732 B1 | 8/2004 | Bates et al. | |
| 6,792,543 B2 | 9/2004 | Pak et al. | |
| 6,804,780 B1 | 10/2004 | Touboul | |
| 6,813,711 B1 | 11/2004 | Dimenstein | |
| 6,829,654 B1 | 12/2004 | Jungck | |
| 6,842,748 B1 | 1/2005 | Warner et al. | |
| 6,851,057 B1 | 2/2005 | Nachenberg | |
| 6,910,134 B1 | 6/2005 | Maher, III et al. | |
| 6,931,540 B1 | 8/2005 | Edwards et al. | |
| 6,959,441 B2 | 10/2005 | Moore et al. | |
| 6,965,968 B1 | 11/2005 | Touboul | |
| 6,971,019 B1 | 11/2005 | Nachenberg | |
| 6,973,488 B1 | 12/2005 | Yavatkar et al. | |
| 6,973,577 B1 | 12/2005 | Kouznetsov et al. | |
| 6,973,578 B1 | 12/2005 | McIchionc | |
| 6,996,706 B1 | 2/2006 | Madden et al. | |
| 6,996,845 B1 | 2/2006 | Hurst et al. | |
| 7,043,634 B2 | 5/2006 | Wolff et al. | |
| 7,055,008 B2 | 5/2006 | Niles et al. | |
| 7,058,822 B2 | 6/2006 | Edery et al. | |
| 7,058,976 B1 | 6/2006 | Dark | |
| 7,065,790 B1 | 6/2006 | Gryaznov | |
| 7,093,239 B1 | 8/2006 | van der Made | |
| 7,103,913 B2 | 9/2006 | Arnold et al. | |
| 7,107,617 B2 | 9/2006 | Hursey et al. | |
| 7,114,185 B2 | 9/2006 | Moore et al. | |
| 7,146,429 B2 | 12/2006 | Michel | |
| 7,150,045 B2 | 12/2006 | Koelle et al. | |
| 7,155,742 B1 | 12/2006 | Szor | |
| 7,171,690 B2 | 1/2007 | Kouznetsov | |
| 7,177,937 B2 | 2/2007 | Bates et al. | |
| 7,178,166 B1 | 2/2007 | Taylor et al. | |
| 7,210,168 B2 | 4/2007 | Hursey et al. | |
| 7,216,367 B2 | 5/2007 | Szor | |
| 7,246,209 B2 | 7/2007 | Tran et al. | |
| 7,257,595 B2 | 8/2007 | Verma et al. | |
| 7,266,843 B2 | 9/2007 | Tarbotton et al. | |
| 7,275,215 B2 | 9/2007 | Werndorfer et al. | |
| 7,284,020 B2 | 10/2007 | Shitomi et al. | |
| 7,284,273 B1 | 10/2007 | Szor | |
| 7,287,279 B2 | 10/2007 | Bertman et al. | |
| 7,302,584 B2 | 11/2007 | Tarbotton et al. | |
| 7,346,611 B2 | 3/2008 | Burtscher | |
| 7,380,136 B2 | 5/2008 | Zimmer et al. | |
| 7,380,277 B2 | 5/2008 | Szor | |
| 7,383,299 B1 | 6/2008 | Hailpern et al. | |
| 7,383,581 B1 | 6/2008 | Moore et al. | |
| 7,406,466 B2 | 7/2008 | Roy et al. | |
| 7,423,995 B1 * | 9/2008 | Elliott et al. | 370/332 |
| 7,461,104 B2 | 12/2008 | Nichols et al. | |
| 7,467,206 B2 | 12/2008 | Moore et al. | |
| 7,480,683 B2 | 1/2009 | Thomas | |
| 7,483,982 B2 | 1/2009 | Hegli et al. | |
| 7,484,245 B1 | 1/2009 | Friedman et al. | |
| 7,484,247 B2 | 1/2009 | Rozman et al. | |
| 7,490,352 B2 | 2/2009 | Kramer et al. | |
| 7,493,403 B2 | 2/2009 | Shull et al. | |
| 7,530,106 B1 | 5/2009 | Zaitsev et al. | |
| 7,533,131 B2 | 5/2009 | Thomas | |
| 7,565,695 B2 | 7/2009 | Burtscher | |
| 7,590,707 B2 | 9/2009 | McCloy, III et al. | |
| 7,591,016 B2 | 9/2009 | Horne | |
| 7,603,440 B1 | 10/2009 | Grabowski et al. | |
| 7,617,534 B1 | 11/2009 | Szor et al. | |
| 7,721,333 B2 | 5/2010 | Horne | |
| 7,738,373 B2 | 6/2010 | Lerner | |
| 7,769,992 B2 | 8/2010 | Wang | |
| 7,849,185 B1 | 12/2010 | Rockwood | |
| 7,996,898 B2 | 8/2011 | Mood et al. | |
| 7,996,903 B2 | 8/2011 | Sprowls | |
| 8,001,582 B2 | 8/2011 | Hulten et al. | |

(56) References Cited

U.S. PATENT DOCUMENTS

| | | |
|---|---|---|
| 8,065,514 B2 | 11/2011 | Wang |
| 8,079,032 B2 | 12/2011 | Nichols |
| 8,140,839 B2 | 3/2012 | Wang |
| 8,181,244 B2 | 5/2012 | Boney |
| 8,190,868 B2 | 5/2012 | Schneider |
| 8,201,243 B2 | 6/2012 | Boney |
| 8,312,479 B2 | 11/2012 | Boillot |
| 8,321,910 B1 | 11/2012 | English et al. |
| 8,381,296 B2 | 2/2013 | Sprowls |
| 8,387,147 B2 | 2/2013 | Sprowls |
| 8,438,386 B2 | 5/2013 | Hegli et al. |
| 8,452,744 B2 | 5/2013 | Nichols et al. |
| 8,635,438 B2 | 1/2014 | Wang |
| 8,667,586 B2 | 3/2014 | Boney |
| 8,856,505 B2 | 10/2014 | Schneider |
| 2001/0029511 A1 | 10/2001 | Burda |
| 2001/0042213 A1* | 11/2001 | Jemes ............... H04L 29/06 726/3 |
| 2001/0044901 A1 | 11/2001 | Grawrock |
| 2001/0047451 A1 | 11/2001 | Noble |
| 2002/0052928 A1 | 5/2002 | Stern et al. |
| 2002/0078381 A1 | 6/2002 | Farley et al. |
| 2002/0083343 A1 | 6/2002 | Crosbie et al. |
| 2002/0120871 A1 | 8/2002 | Watkins et al. |
| 2002/0129277 A1 | 9/2002 | Caccavale |
| 2002/0143984 A1 | 10/2002 | Hudson |
| 2002/0162015 A1 | 10/2002 | Tang |
| 2002/0162017 A1 | 10/2002 | Sorkin |
| 2002/0166059 A1 | 11/2002 | Rickey et al. |
| 2002/0166063 A1 | 11/2002 | Lachman et al. |
| 2003/0005183 A1 | 1/2003 | Burr et al. |
| 2003/0023865 A1 | 1/2003 | Cowie et al. |
| 2003/0046558 A1 | 3/2003 | Teblyashkin et al. |
| 2003/0051057 A1 | 3/2003 | Garnett et al. |
| 2003/0065926 A1 | 4/2003 | Schultz et al. |
| 2003/0065943 A1 | 4/2003 | Geis et al. |
| 2003/0074573 A1 | 4/2003 | Hursey et al. |
| 2003/0074581 A1 | 4/2003 | Hursey et al. |
| 2003/0079145 A1 | 4/2003 | Kouznetsov et al. |
| 2003/0084323 A1 | 5/2003 | Gales |
| 2003/0097409 A1 | 5/2003 | Tsai |
| 2003/0101381 A1 | 5/2003 | Mateev et al. |
| 2003/0105973 A1 | 6/2003 | Liang |
| 2003/0110391 A1 | 6/2003 | Wolff et al. |
| 2003/0115479 A1 | 6/2003 | Edwards et al. |
| 2003/0120947 A1 | 6/2003 | Moore et al. |
| 2003/0120951 A1 | 6/2003 | Gartside et al. |
| 2003/0120952 A1 | 6/2003 | Tarbotton et al. |
| 2003/0135791 A1 | 7/2003 | Natvig |
| 2003/0154399 A1 | 8/2003 | Zuk et al. |
| 2003/0159070 A1 | 8/2003 | Mayer et al. |
| 2003/0196103 A1 | 10/2003 | Edwards et al. |
| 2003/0212902 A1 | 11/2003 | Made |
| 2003/0212906 A1 | 11/2003 | Arnold et al. |
| 2003/0217286 A1 | 11/2003 | Carmona et al. |
| 2003/0217287 A1 | 11/2003 | Kruglenko |
| 2003/0229801 A1 | 12/2003 | Kouznetsov et al. |
| 2003/0233566 A1 | 12/2003 | Kouznetsov et al. |
| 2003/0233574 A1 | 12/2003 | Kouznetsov et al. |
| 2004/0003276 A1 | 1/2004 | Kouznetsov et al. |
| 2004/0003290 A1 | 1/2004 | Malcolm |
| 2004/0010703 A1 | 1/2004 | Kouznetsov et al. |
| 2004/0015712 A1 | 1/2004 | Szor |
| 2004/0015726 A1 | 1/2004 | Szor |
| 2004/0024864 A1 | 2/2004 | Porras et al. |
| 2004/0025042 A1 | 2/2004 | Kouznetsov et al. |
| 2004/0030912 A1 | 2/2004 | Merkle et al. |
| 2004/0030914 A1 | 2/2004 | Kelley et al. |
| 2004/0034794 A1 | 2/2004 | Mayer et al. |
| 2004/0064515 A1 | 4/2004 | Hockey |
| 2004/0064736 A1 | 4/2004 | Obrecht et al. |
| 2004/0068664 A1 | 4/2004 | Nachenberg et al. |
| 2004/0080529 A1 | 4/2004 | Wojcik |
| 2004/0088570 A1 | 5/2004 | Roberts et al. |
| 2004/0122926 A1 | 6/2004 | Moore et al. |
| 2004/0133790 A1 | 7/2004 | Hensley |
| 2004/0143661 A1 | 7/2004 | Higashi et al. |
| 2004/0143763 A1 | 7/2004 | Radatti |
| 2004/0148281 A1 | 7/2004 | Bates et al. |
| 2004/0172551 A1 | 9/2004 | Fielding |
| 2004/0187023 A1 | 9/2004 | Alagna et al. |
| 2004/0199763 A1 | 10/2004 | Freund |
| 2004/0199827 A1 | 10/2004 | Muttik et al. |
| 2004/0225877 A1 | 11/2004 | Huang |
| 2004/0230530 A1 | 11/2004 | Searl et al. |
| 2004/0243829 A1 | 12/2004 | Jordan |
| 2004/0255165 A1 | 12/2004 | Szor |
| 2004/0255167 A1 | 12/2004 | Knight |
| 2004/0268315 A1 | 12/2004 | Gouriou et al. |
| 2005/0005160 A1 | 1/2005 | Bates |
| 2005/0021994 A1 | 1/2005 | Barton et al. |
| 2005/0027686 A1 | 2/2005 | Shipp |
| 2005/0033975 A1 | 2/2005 | Lahti et al. |
| 2005/0038697 A1 | 2/2005 | Aaron |
| 2005/0039029 A1 | 2/2005 | Shipp |
| 2005/0055558 A1 | 3/2005 | Carmona |
| 2005/0071624 A1 | 3/2005 | Rothman et al. |
| 2005/0071649 A1 | 3/2005 | Shipp |
| 2005/0081053 A1 | 4/2005 | Aston et al. |
| 2005/0114687 A1 | 5/2005 | Zimmer et al. |
| 2005/0120242 A1 | 6/2005 | Mayer et al. |
| 2005/0125687 A1 | 6/2005 | Townsend et al. |
| 2005/0132177 A1 | 6/2005 | Challener et al. |
| 2005/0138433 A1 | 6/2005 | Linetsky |
| 2005/0149726 A1 | 7/2005 | Joshi |
| 2005/0154885 A1 | 7/2005 | Viscomi et al. |
| 2005/0154900 A1 | 7/2005 | Muttik |
| 2005/0155031 A1 | 7/2005 | Wang et al. |
| 2005/0169282 A1 | 8/2005 | Wittman |
| 2005/0172115 A1 | 8/2005 | Bordorin |
| 2005/0172337 A1 | 8/2005 | Bodorin et al. |
| 2005/0172338 A1 | 8/2005 | Sandu et al. |
| 2005/0177868 A1 | 8/2005 | Kwan |
| 2005/0188272 A1 | 8/2005 | Bordorin et al. |
| 2005/0188423 A1 | 8/2005 | Motsinger et al. |
| 2005/0204050 A1 | 9/2005 | Turley et al. |
| 2005/0204205 A1 | 9/2005 | Ring et al. |
| 2005/0216759 A1 | 9/2005 | Rothman et al. |
| 2005/0223238 A1 | 10/2005 | Schmid et al. |
| 2005/0229250 A1 | 10/2005 | Ring et al. |
| 2005/0257266 A1 | 11/2005 | Cook et al. |
| 2005/0262558 A1 | 11/2005 | Usov |
| 2005/0262567 A1 | 11/2005 | Carmona |
| 2005/0268112 A1 | 12/2005 | Wang et al. |
| 2005/0268338 A1 | 12/2005 | Made |
| 2005/0273858 A1 | 12/2005 | Zadok et al. |
| 2005/0278783 A1 | 12/2005 | Chien et al. |
| 2005/0278785 A1 | 12/2005 | Lieberman |
| 2005/0283838 A1 | 12/2005 | Saito |
| 2006/0010485 A1 | 1/2006 | Gorman |
| 2006/0020779 A1 | 1/2006 | Rothman et al. |
| 2006/0031667 A1 | 2/2006 | Raghunandan |
| 2006/0031940 A1 | 2/2006 | Rozman et al. |
| 2006/0041942 A1 | 2/2006 | Edwards |
| 2006/0074896 A1 | 4/2006 | Thomas et al. |
| 2006/0075468 A1 | 4/2006 | Boney et al. |
| 2006/0075490 A1 | 4/2006 | Boney et al. |
| 2006/0075494 A1 | 4/2006 | Bertman et al. |
| 2006/0075501 A1 | 4/2006 | Thomas et al. |
| 2006/0080637 A1 | 4/2006 | Treit et al. |
| 2006/0085528 A1 | 4/2006 | Thomas |
| 2006/0095967 A1 | 5/2006 | Durham et al. |
| 2006/0101263 A1 | 5/2006 | Costea et al. |
| 2006/0101264 A1 | 5/2006 | Costea et al. |
| 2006/0101282 A1 | 5/2006 | Costea et al. |
| 2006/0112235 A1 | 5/2006 | Cabot |
| 2006/0123244 A1 | 6/2006 | Gheorghescu et al. |
| 2006/0129744 A1 | 6/2006 | Rothman et al. |
| 2006/0136720 A1 | 6/2006 | Armstrong et al. |
| 2006/0143703 A1 | 6/2006 | Hopen et al. |
| 2006/0150256 A1 | 7/2006 | Fanton et al. |
| 2006/0161793 A1 | 7/2006 | Orr |
| 2006/0161988 A1 | 7/2006 | Costea et al. |
| 2006/0167948 A1 | 7/2006 | Gian-Nicolas |

(56) References Cited

U.S. PATENT DOCUMENTS

| | | |
|---|---|---|
| 2006/0168165 A1 | 7/2006 | Boss et al. |
| 2006/0184792 A1 | 8/2006 | Berlin |
| 2006/0200863 A1 | 9/2006 | Ray et al. |
| 2006/0218637 A1 | 9/2006 | Thomas et al. |
| 2006/0230290 A1 | 10/2006 | Burtscher |
| 2006/0230291 A1 | 10/2006 | Burtscher |
| 2006/0236069 A1 | 10/2006 | Kalach |
| 2006/0236389 A1 | 10/2006 | Horne |
| 2006/0236396 A1 | 10/2006 | Horne |
| 2006/0236397 A1 | 10/2006 | Horne |
| 2006/0253578 A1 | 11/2006 | Dixon et al. |
| 2006/0253581 A1* | 11/2006 | Dixon et al. ............ 709/225 |
| 2006/0259974 A1 | 11/2006 | Marinescu et al. |
| 2006/0265761 A1 | 11/2006 | Rochette |
| 2006/0272021 A1 | 11/2006 | Marinescu et al. |
| 2006/0277182 A1 | 12/2006 | Nichols et al. |
| 2006/0277183 A1 | 12/2006 | Nichols et al. |
| 2006/0288416 A1 | 12/2006 | Costea et al. |
| 2006/0294590 A1 | 12/2006 | Enstone et al. |
| 2007/0006310 A1 | 1/2007 | Piccard |
| 2007/0006311 A1 | 1/2007 | Barton et al. |
| 2007/0016914 A1 | 1/2007 | Yeap |
| 2007/0039052 A1 | 2/2007 | Chandnani |
| 2007/0050848 A1 | 3/2007 | Khalid |
| 2007/0072678 A1 | 3/2007 | Dagres |
| 2007/0074289 A1 | 3/2007 | Maddaloni |
| 2007/0078675 A1 | 4/2007 | Kaplan |
| 2007/0079379 A1 | 4/2007 | Sprosts et al. |
| 2007/0094496 A1 | 4/2007 | Burtscher |
| 2007/0094725 A1 | 4/2007 | Borders |
| 2007/0094726 A1 | 4/2007 | Wilson et al. |
| 2007/0094733 A1 | 4/2007 | Wilson et al. |
| 2007/0101431 A1 | 5/2007 | Clift |
| 2007/0130350 A1 | 6/2007 | Alperovitch et al. |
| 2007/0143843 A1 | 6/2007 | Nason et al. |
| 2007/0168285 A1 | 7/2007 | Girtakovskis et al. |
| 2007/0168694 A1 | 7/2007 | Maddaloni et al. |
| 2007/0168982 A1 | 7/2007 | Horne |
| 2007/0169191 A1 | 7/2007 | Greene et al. |
| 2007/0169197 A1 | 7/2007 | Horne |
| 2007/0169198 A1 | 7/2007 | Maddaloni et al. |
| 2007/0174911 A1 | 7/2007 | Kronenberg et al. |
| 2007/0179834 A1 | 8/2007 | Carter et al. |
| 2007/0203884 A1 | 8/2007 | Nichols et al. |
| 2007/0220043 A1 | 9/2007 | Oliver et al. |
| 2007/0226445 A1 | 9/2007 | Nichols et al. |
| 2007/0226704 A1 | 9/2007 | Nichols |
| 2007/0226800 A1 | 9/2007 | Nichols |
| 2007/0240222 A1 | 10/2007 | Tuvell et al. |
| 2007/0250817 A1 | 10/2007 | Boney |
| 2007/0261117 A1 | 11/2007 | Boney |
| 2007/0283439 A1 | 12/2007 | Ballard |
| 2008/0010326 A1 | 1/2008 | Carpenter et al. |
| 2008/0015925 A1 | 1/2008 | Sundaresan |
| 2008/0021958 A1 | 1/2008 | Foote |
| 2008/0052758 A1 | 2/2008 | Byrnes |
| 2008/0082352 A1* | 4/2008 | Schmidtler ............ G06Q 50/18 705/2 |
| 2008/0082662 A1* | 4/2008 | Dandliker ............ H04L 63/10 709/225 |
| 2008/0097936 A1 | 4/2008 | Schmidtler et al. |
| 2008/0235163 A1 | 9/2008 | Balasubramanian et al. |
| 2009/0006569 A1 | 1/2009 | Morss et al. |
| 2009/0063248 A1 | 3/2009 | Chong et al. |
| 2009/0064337 A1 | 3/2009 | Chien |
| 2009/0132689 A1* | 5/2009 | Zaltzman ............ G06Q 10/00 709/223 |
| 2009/0178125 A1 | 7/2009 | Barber et al. |
| 2009/0271428 A1 | 10/2009 | Adelman et al. |
| 2009/0287641 A1 | 11/2009 | Rahm |
| 2009/0299925 A1 | 12/2009 | Ramaswamy et al. |
| 2009/0300720 A1 | 12/2009 | Guo et al. |
| 2010/0184505 A1 | 7/2010 | Bryson et al. |
| 2011/0040825 A1 | 2/2011 | Ramzan et al. |
| 2011/0047076 A1 | 2/2011 | Carlson et al. |
| 2011/0167050 A1 | 7/2011 | Fanton et al. |
| 2011/0289587 A1 | 11/2011 | Sprowls |
| 2012/0005752 A1 | 1/2012 | Sprowls |
| 2015/0089648 A1 | 3/2015 | Schneider |

FOREIGN PATENT DOCUMENTS

| | | |
|---|---|---|
| WO | WO 93/25024 | 12/1993 |
| WO | WO 98/45778 | 10/1998 |
| WO | WO 02/084482 | 10/2002 |
| WO | WO 2006/039351 | 4/2006 |
| WO | WO 2006/077443 | 7/2006 |
| WO | WO 2007/050766 | 5/2007 |
| WO | WO 2007/084947 | 7/2007 |
| WO | WO 2008/008142 | 1/2008 |

OTHER PUBLICATIONS

Techterms "Vector" Nov. 7, 2007 [Online] Downloaded Feb. 18, 2015 http://techterms.com/definition/vector.*

Techterms-2 "URI" Nov. 1, 2007 [Online] Downloaded Feb. 18, 2015 http://techterms.com/definition/uri.*

Marcus Hutter "Introduction to Statistical Machine Learning" Mar. 2008 [Online] Downloaded May 1, 2019 https://web.archive.org/web/20080719014125/http://kioloa08.mlss.cc/files/hutter1.pdf (Year: 2008).*

Bai et al. (2012) IET Information Security 8(2):140-151 "Approach for malware identification using dynamic behaviour and outcome triggering".

Bontchev (1992) Virus Bulletin Conference 131-141 "Possible Virus Attacks Against Integrity Programs and How to Prevent Them".

Bruschi et al. (2000) IEEE 188-195 "Less Harm, Less Worry or How to Improve Network Security by Bounding System Offensiveness".

Clarke (2009) Department of Mathematics, University of London, Technical Report 178 pages "Fuzzing for Software Vulnerability Discovery".

Codeguru (2003) Three Ways to Inject Your Code into Another Process by Robert Kuster, 22 pages.

Codeguru (2004) Managing Low-Level Keyboard Hooks with the Windows API for VB Net by Paul Kimmel, 10 pages.

Codeguru (2001) Hooking the Keyboard by Anoop Thomas, 6 pages.

The Computer Guy Magazine (2011) "Virus, Malware, Oh My?" 19 pages.

Erbschole (2005) Elsevier Butterworth-Heinemann 185-189 "Trojans, Worms, and Spyware: A Computer Security Professional's Guide to Malicious Code".

Fellows (2005) Digital Investigation 2:89-93 "The joys of complexity and the deleted file".

Harley, et al. (2001) Osborne/McGraw-Hill 219-229 "Viruses Revealed".

Hruska (1997) European Conference on Security and Detection 128-131 "Virus Detection".

International Search Report from Application No. PCT/US05/34874, dated Jul. 5, 2006, 14 pages.

International Search Report and Written Opinion from Application No. PCT/US2006/008882, dated Oct. 19, 2007, 5 pages.

International Search Report from Application No. PCT/US2006/008883, dated Oct. 19, 2007, 5 pages.

International Search Report and Written Opinion from Application No. PCT/US2006/014003, dated Jul. 17, 2007, 6 pages.

International Search Report and Written Opinion from Application No. PCT/US2006/014004, dated Jan. 22, 2007, 4 pages.

International Search Report and Written Opinion from Application No. PCT/US2006/014405, dated Nov. 29, 2007, 5 pages.

International Search Report from Application No. PCT/US2006/025378, dated Sep. 18, 2007, 10 pages.

International Search Report from Application No. PCT/US2006/041798, dated Dec. 4, 2007, 8 pages.

International Search Report and Written Opinion, Application No. PCT/US2006/041799, dated Oct. 14, 2008, 5 pages.

International Search Report and Written Opinion from Application No. PCT/US2007/062947, dated Jun. 29, 2007, 8 pages.

(56) References Cited

OTHER PUBLICATIONS

International Search Report and Written Opinion from Application No. PCT/US2007/064487, dated Nov. 30, 2007, 8 pages.
International Search Report and Written Opinion from Application No. PCT/US2007/064488, dated Sep. 9, 2007, 9 pages.
International Search Report from Application No. PCT/US2007/064489 dated Sep. 27, 2007, 8 pages.
International Search Report from Application No. PCT/US2007/064490, dated Jul. 23, 2007, 10 pages.
International Search Report from Application No. PCT/US2007/067076, dated Nov. 2, 2007, 10 pages.
International Search Report from Application No. PCT/US2007/067078, dated Nov. 2, 2007, 9 pages.
International Search Report from Application No. PCT/US2007/067082, dated Nov. 5, 2007, 8 pages.
International Search Report from Application No. PCT/US2007/067084, dated Nov. 5, 2007, 11 pages.
Japanese Patent Application No. 2015-101464, Office Action dated May 10, 2016, 9 pages.
Julisch, et al. (2005) DIMVA Second International Conference July 7-8 Vienna, Austria "Detection of Intrusions and Malware, and Vulnerability Assessment".
Kim (2004) "Intercepting System API Calls" 6 pages Available at: https://software.intel.com/en-us/articles/intercepting-system-api-calls.
Lin, et al. (2003) Database EPODOC "Method and System for Computing Fragment Rate of Magnetic Disc" XP002451265 Abstract Only.
Lin, et al. (2003) Database EPODOC "Method and System for Computing Fragment Rate of Disc" XP002451266 Abstract Only.
Linn, et al. (2003) "Obfuscation of Executable Code to Improve Resistance to Static Disassembly" ACM 290-299.
Marsh (1993) "Win32 Hooks" 15 pages Available at: http://msdn.microsoft.com/library/en-us/dnwui/html/msdn_hooks32.asp/?frame=true.
Microsoft (2005) "How to Subclass a Window in Windows 95" 2 pages Available at: http://support.microsoft.com/kb/q125680/.
Microsoft SysInternals (2006) "Rootkit Revealer 1.71" Online Available at: http://filehippo.com/download_rootkit_revealer/ Accessed on: Nov. 17, 2015.
Mikhaliov (2005) "NTFS file system" 8 pages Available at: http://www.digit-life.com/articles/ntfs/ Accessed on Jun. 18, 2007.
Milenković, et al. (2005) ACM SIGARCH Computer Architecture News 33(1):108-117 "Using Instruction Block Signatures to Counter Code Injection Attacks".
Mookhey (2004) "Common Security Vulnerabilities in e-commerce Systems" Symantec 8 pages Available at: http://www.symantec.com/connect/articles/common-security-vulnerabilities-e-commerce-systems; Retrieved on Sep. 9, 2016.
Nachenberg (1997) Communications of the ACM 40(1):46-51 "Computer Virus—Coevolution: The battle to conquer computer viruses is far from won, but new and improved antidotes are controlling the field."
OSDir.com (2004) "ntfsprogs-todo [Long]" Online Available at: http://osdir.com/ml/linux.file-systems.ntfs.devel/2004-08/msg00023.html; Retrieved on Nov. 13, 2015.
Rabek, et al. (2003) ACM 76-82 "Detection of Injected, Dynamically Generated, and Obfuscated Malicious Code".
Roelker (2004) Sourcefire, Inc. "HTTP IDS Evasions Revisited" Online: Availabe at: https://s3.amazonaws.com/snort-org-site/production/document_files/files/000/000/031/original/sf_HTTP_IDS_evasions.pdf?AWSAccessKeyId=AKIAIXACIED2SPMSC7GA&Expires=1447872643&Signature=GlTFKHYyb1mABkFA09oXzegOEkY%3D; Retrieved on Nov. 18, 2015.
Salomon (2010) Undergraduate Topics in Computer Science "Elements of Computer Society" 19 pages.
Singh, et al. (2002) ACM SIGPLAN Notices 37(2): 29-35 "Analysis and Detection of Computer Viruses and Worms: An Annotated Bibliography".
Skoudis (2004) Malware: Fighting Malicious Code 590-618 "Chapter 11: Malware Analysis".
Su, et al. (2006) POPL 372-382 "The Essence of Command Injection Attacks in Web Applications".
Tittel (2005) PC Magazine 328-335 "Fighting Spyware, Viruses, and Malware".
Unknown Author (2006) Illusive Society "Wolves in Sheep's Clothing: Malicious DLLs Injected into Trusted Host Applications" 13 pages Available from: http://home.arcor.de/scheinsicherheit/dll.htm.
Wang et al. (2005) IEEE, International Conference on Dependable Systems "Detecting Stealth Software with Strider GhostBuster" 10 pages.
Wen et al. (2008) IEEE, International Conference on Information Security and Assurance 150-155 "Implicit Detection of Hidden Processes with a Local-Booted Virtual Machine".
Whittaker, et al. (2002) ACM 242-246 "Neutralizing Windows-Based Malicious Mobile Code".
X-Ways Software Technology AG (2005) "X-Ways Forensics: Integrated Computer Forensics Software" 3 pages Available from: http://web.archive.org/web/20050829195657/http://www.x-ways.net/forensics/index-m.html.
Yurcik et al. (2001) IEEE IT Pro 41-44 "A Planning Framework for Implementing Virtual Private Networks".
European Patent Application No. 05807741.3, Search Report dated Feb. 15, 2012, 2 pages.
European Patent Application No. 05807741.3, Communication dated Apr. 27, 2012, 6 pages.
Kan, et al. (Aug. 2005) NUS School of Computing "Fast webpage classification using URL features" [online] Available from: http://www.comp.nus.edu.sg/~kanmy/papers/nustrc8_05.pdf (Accessed on Jan. 28, 2015).
Great Britain Patent Application No. 1119949.4, Examination Report dated Nov. 8, 2013, 3 pages.
Great Britain Patent Application No. 1119949.4, Notification of Grant dated Jun. 17, 2014, 2 pages.
Great Britain Patent Application No. 1406624.5, First Examination Report dated Jul. 31, 2014, 8 pages.
Great Britain Patent Application No. 1406624.5, Second Examination Report dated Dec. 31, 2014, 3 pages.
Great Britain Patent Application No. 1406626.0, First Examination Report dated Jul. 31, 2014, 10 pages.
Great Britain Patent Application No. 1406626.0, Second Examination Report dated Dec. 31, 2014, 4 pages.
Great Britain Patent Application No. 1406624.5, Notification of Grant dated Jan. 27, 2015, 2 pages.
Great Britain Patent Application No. 1406626.0, Notification of Grant dated Jan. 27, 2015, 2 pages.
International Search Report from Application No. PCT/US05/34873, dated Jun. 12, 2008, 2 pages.
International Search Report from Application No. PCT/US2010/025702, dated Sep. 17, 2010, 4 pages.
Japanese Patent Application No. 2012-507228, Office Action dated Feb. 21, 2014, 3 pages (English Translation).
Japanese Patent Application No. 2012-507228, Decision of Rejection dated Jan. 20, 2015, 3pages (English Translation).
Nguyen, et al. (Dec. 2006) Proceedings of the 6th International Conference on Internet Information Retrieval, Korea 143-149 "A Maximum Entropy Model for Text Classification" Available from: http://www.uet.vnu.edu.vn/~thuyhq/papers/06_NNH_International%20Conference%20on%20Internet%20Information%20Retrieval_IRC2006_143_149.pdf (Accessed on Jan. 28, 2015).
U.S. Appl. No. 10/956,274, Non-Final Rejection dated Jan. 27, 2006, 27 pages.
U.S. Appl. No. 10/956,274, Amendment and Response filed Apr. 25, 2006, 15 pages.
U.S. Appl. No. 10/956,274, Final Rejection dated Jul. 3, 2006, 28 pages.
U.S. Appl. No. 10/956,274, Non-Final Rejection dated Jan. 5, 2007, 29 pages.
U.S. Appl. No. 10/956,274, Amendment and Response filed Mar. 7, 2007, 15 pages.

(56) References Cited

OTHER PUBLICATIONS

U.S. Appl. No. 10/956,274, Notice of Allowance dated May 1, 2007, 14 pages.
U.S. Appl. No. 12/709,504, Non-final Office Action dated Apr. 12, 2012, 22 pages.
U.S. Appl. No. 12/709,504, Amendment and Response filed Oct. 11, 2012, 18 pages.
U.S. Appl. No. 12/709,504, Supplemental Amendment filed Nov. 2, 2012, 10 pages.
U.S. Appl. No. 12/709,504, Notice of Allowance dated Jan. 10, 2013, 12 pages.

* cited by examiner www.brightcloudclient.com/internetaccesspolicy

Internet Access Policy

The reputation index for this Internet service is below the threshold for the local area network and therefore access is denied.

SYSTEM AND METHOD FOR DEVELOPING A RISK PROFILE FOR AN INTERNET RESOURCE

CROSS REFERENCE TO RELATED APPLICATION

The present application is a continuation of U.S. patent application Ser. No. 12/709,504, filed on Feb. 21, 2010, issued as U.S. Pat. No. 8,438,386, which claims the benefits of and priority, under 35 U.S.C. § 119(e), to U.S. Provisional Patent Application Ser. No. 61/241389, filed on Sep. 10, 2009 and U.S. Provisional Patent Application Ser. No. 61/171,264, filed on Apr. 21, 2009, all of which are hereby incorporated by reference in their entireties for all that they teach and for all purposes.

STATEMENT REGARDING FEDERALLY SPONSORED RESEARCH OR DEVELOPMENT

Not Applicable

BACKGROUND OF THE INVENTION

1. Field of the Invention

The present invention is related to assessing risk profiles of Internet resources. More specifically, the present invention is related to a system and method for developing a risk profile for an Internet resource by generating a reputation index, based on attributes of the resource collectively referred to as the reputation vector of the resource.

2. Description of the Related Art

Management of internet access, particularly to Web sites, has been accomplished in the past using "Content Filtering", where Web sites are organized into categories and requests for Web content are matched against per-category policies and either allowed or blocked. This type of management focuses on the subject matter of a Web site, and provides visibility into, for example, how employees spend their time, and their company's network bandwidth usage, during the course of the day. These solutions also allow companies to enforce established internet usage policy (IUP) by blocking Web sites whose subject matter violates their IUP.

Security solutions, such as anti-virus products, examine file or Web page content to discover known patterns or signatures that represent security threats to users, computers, or corporate networks. These focus not on the subject matter of a site, but look for viruses and other 'malware' that are currently infecting the site. However, current solutions to management of Internet resources fail to measure the security risk associated with accessing an Internet resource in a more predictive way, before infections are isolated and signatures are identified and distributed.

A possible analogy to the reputation of an Internet resource is the credit score of an individual. A Web user would want to be informed of the reputation of a Web site before visiting it, just as a lender would want to know the reputation, the financial reputation at least, of a borrower of the lender's money.

A credit score is based on a variety of fairly tightly related factors, such as existing debt, available credit lines, on-time payments, existing credit balances, etc.

In the United States, a credit score is a number based on a statistical analysis of a person's credit files that represents the creditworthiness of that person, which is the likelihood that the person will pay their bills. A credit score is primarily based on credit information, typically from one of the three major credit agencies.

There are different methods of calculating credit scores. The best known one, FICO, is a credit score developed by the Fair Isaac Corporation. FICO is used by many mortgage lenders that use a risk-based system to determine the possibility that the borrower may default on financial obligations to the mortgage lender.

FICO® scores are provided to lenders by the three major credit reporting agencies: Equifax, Experian and TransUnion. When lenders order your credit report, they can also buy a FICO® score that is based on the information in the report. That FICO® score is calculated by a mathematical equation that evaluates many types of information from the borrower's credit report at that agency. In order for a FICO® score to be calculated on the borrower's credit report, the report must contain sufficient information—and sufficient recent information—on which to base a score. Generally, that means the borrower must have at least one account that has been open for six months or longer, and at least one account that has been reported to the credit reporting agency within the last six months.

FICO scores provide a reliable guide to future risk based solely on credit report data. FICO® scores have a 300-850® score range. The higher the score, the lower the risk. But no score says whether a specific individual rill be a "good" or "bad" customer. And while many lenders use FICO® scores to help them make lending decisions, each lender has its own strategy to determine if a potential borrower is a good customer. Although FICO won't reveal exactly how it determines a credit score, it considers the following factors: payment history (35%); outstanding debt (30%); length of credit history (15%); types of credit (10%); and new credit (10%).

Returning to Internet resources, attackers have been using the Internet to attack the computers and other devices of users of the Internet. Attackers continue to take advantage of flaws in traditional security measures and bypass reputation-based systems to increase attack effectiveness.

In 2008, massive attacks were conducted that compromised hundreds of thousands of legitimate Web sites with good reputations worldwide with data-stealing malicious code. The attacks included sites from MSNBC, ZDNet, Wired, the United Nations, a large UK government site, and more. In the attacks, when a user's browser opened one of the thousands of compromised sites, a carefully crafted iframe HTML tag redirected users to a malicious site rife with exploits. As a result, malicious code, designed to steal confidential information, was launched on vulnerable machines. In addition to Web exploits, email spammers are also taking advantage of the reputation of popular email services like Yahoo! and Gmail to bypass anti-spam systems.

Also, spammers use sophisticated tools and bots to break the "CAPTCHA-" systems that were developed to keep email and other services safe from spammers and other malicious activity. MICROSOFT Live Mail, GOOGLE's popular Gmail service and Yahoo! mail services were all compromised by this breakthrough method. Subsequently, spammers have been able to sign up for the free email accounts on a mass basis and send out spam from email accounts with good reputations. With a free signup process, access to a wide portfolio of services and domains that are unlikely to be blacklisted given their reputation, spammers have been able to launch attacks on millions of users worldwide while maintaining anonymity.

Thus, prior art solutions have focused on security when accessing known infected sites in the Internet from a network such as a local area network or a wide area network.

Hegli et al., U.S. Pat. No. 7,483,982 for Filtering Techniques For Managing Access To Internet Sites Or Other Software Applications discloses a system and method for controlling an end user's access to the Internet by blocking certain categorized sites or limiting access based on bandwidth usage.

Hegli et al., U.S. Pat. No. 6,606,659 for a System And Method For Controlling Access To Internet Sites discloses a system and method for controlling an end user's access to the Internet by blocking certain categorized sites or limiting the number of times the end user can access an Internet site.

Yavatkar et al., U.S. Pat. No. 6,973,488 for Providing Policy Information To A Remote Device discloses a method for distributing high level policy information to remote network devices using a low-level configuration.

Turley et al., U.S. Patent Publication Number 2005/0204050 for a Method And System For Controlling Network Access discloses a system and method for controlling access to a specific site by using a gateway that assigns incoming traffic to specific sections of the site.

Shull et al., U.S. Pat. No. 7,493,403 for Domain Name Validation discloses accessing domain name registries to determine the ownership of a domain and monitoring the domain and registry.

Roy et al., U.S. Pat. No. 7,406,466 for a Reputation Based Search discloses using a search engine to present search results associated with measures of reputation to overcome the problem of META tags skewing the search results.

Hailpern et al., U.S. Pat. No. 7,383,299 for a System And Method For Providing Service For Searching Web Site Addresses discloses Moore et al., U.S. Pat. No. 7,467,206, for a Reputation System For Web Services discloses a system and method for selecting a Web service from a search engine list which is ranked based on reputation information for each Web service.

Definitions for various terms are set forth below.

FTP or File Transfer Protocol is a protocol for moving files over the Internet from one computer to another.

HyperText Markup Language (HTML) is a method of mixing text and other content with layout and appearance commands in a text file, so that a browser can generate a displayed image from the file.

Hypertext Transfer Protocol (HTTP) is a set of conventions for controlling the transfer of information via the Internet from a Web server computer to a client computer, and also from a client computer to a Web server. Internet is the worldwide, decentralized totality of server computers and data-transmission paths which can supply information to a connected and browser-equipped client computer, and can receive and forward information entered from the client computer.

JavaScript is an object-based programming language. JavaScript is an interpreted language, not a compiled language. JavaScript is generally designed for writing software routines that operate within a client computer on the Internet. Generally, the software routines are downloaded to the client computer at the beginning of the interactive session, if they are not already cached on the client computer. JavaScript is discussed in greater detail below.

Parser is a component of a compiler that analyzes a sequence of tokens to determine its grammatical structure with respect to a given formal grammar. Parsing transforms input text into a data structure, usually a tree, which is suitable for later processing and which captures the implied hierarchy of the input. XML Parsers ensure that an XML document follows the rules of XML markup syntax correctly.

URL or Uniform Resource Locator is a address on the World Wide Web.

Web-Browser is a complex software program, resident in a client computer, that is capable of loading and displaying text and images and exhibiting behaviors as encoded in HTML (HyperText Markup Language) from the Internet, and also from the client computer's memory. Major browsers include MICROSOFT INTERNET EXPLORER, NETSCAPE, APPLE SAFARI, MOZILLA FIREFOX, and OPERA.

Web-Server is a computer able to simultaneously manage many Internet information-exchange processes at the same time. Normally, server computers are more powerful than client computers, and are administratively and/or geographically centralized. An interactive-form information-collection process generally is controlled from a server computer, to which the sponsor of the process has access. Servers usually contain one or more processors (CPUs), memories, storage devices and network interface cards. Servers typically store the HTML documents and/or execute code that generates Web-pages that are sent to clients upon request. An interactive-form information-collection process generally is controlled from a server computer, to which the sponsor of the process has access.

World Wide Web Consortium (W3C) is an unofficial standards body which creates and oversees the development of web technologies and the application of those technologies.

XHTML (Extensible Hypertext Markup Language) is a language for describing the content of hypertext documents intended to be viewed or read in a browser.

XML (Extensible Markup Language) is a W3C standard for text document markup, and it is not a language but a set of rules for creating other markup languages.

The prior art fails to provide solutions to the problems with accessing the Internet.

BRIEF SUMMARY OF THE INVENTION

The present invention provides a predictive approach based on a statistical model built on a broad sampling of Internet resources with varying degrees of risk. The present invention focuses on the reputation of a Web site, or any Internet-based service or resource. The reputation incorporates many factors that are relevant to the overall safety of visiting a site. The reputation assesses the over-time track record of the site and the provider that operates the web site, the current characteristics of the pages and related files composing the site, and reputations of sites linked to the site and of referrers to the site. The overall assessment is expressed as a score, not unlike a FICO score, that predicts the potential risk of visiting the site which can be used to protect users from inadvertently visiting or utilizing higher-risk sites or services within the Internet.

There are many components of reputation available within the Internet. Much like other scoring mechanisms, such as credit scoring, the factors to be considered must be decided upon, and the weight that each factor will have in the overall "score" must be determined.

The present invention provides a system and method for defining a reputation of an Internet service such as a Web site.

A basic element of reputation is how long a domain has been registered to a particular company/entity. In addition, a domain which frequently changes hands is also interesting in a negative way relative to reputation.

Preferred steps of the invention are: evaluation of the important features to be included in the collection of reputation-relevant features referred to as the reputation vector; collection of the reputation vectors for a large sample of Internet resource; training of a classifier based on training sets of known high and low reputation services/sites; testing of a model against a wide variety of random samples; run-time evaluation of requests for the Internet resource using the developed classifier and responding to reputation index information requests from clients which enforce network security policy.

The present invention preferably protects users against threats which are typically are not related to the subject matter of the service, or site. The present invention preferably protects users and networks from zero-day threats which have not been characterized or included in anti-virus signature files. The present invention preferably allows network managers to protect users and infrastructure without having to restrict access to particular categories of content. The present invention preferably allows higher security which is independent of cultural or moral biases related to many categories of content.

One aspect of the present invention is a method for controlling access to a Web site. The method includes transmitting a request for a Web site from a browser on a client-side device of a local area network. The Web site resides at a first server. The method also includes receiving the request for the Web site at a security appliance of the local area network prior to transmission of the request over the Internet. The method also includes analyzing a reputation vector for the Web site at the security appliance. The reputation vector includes a plurality of factors for the Web site comprising at least one or more of country of domain registration, country of service hosting, country of an internet protocol address block, age of a domain registration, popularity rank, internet protocol address, number of hosts, top-level domain, a plurality of run-time behaviors, JavaScript block count, picture count, immediate redirect and response latency. The method also includes generating a reputation index for the Web site based on the analysis of the plurality of factors. The method also includes determining if the reputation index for the Web site is above a threshold value established for the local area network. The method also includes transmitting a decision transmission to the browser of the client-side device.

If the reputation index for the Web site is above the threshold value, the method further includes transmitting the request for the Web-site over the Internet to a server for the Web site and receiving a Web page for the Web site at the local area network. In this situation, the decision transmission is the Web page for the Web site. If the reputation index for the Web site is at or below the threshold value, the decision transmission is a Web page from the local area network The method can further include obtaining the plurality of factors for the Web site. Obtaining the plurality of factors for the Web site comprises accessing the Web site, analyzing a plurality of HTML documents for the Web site by crawling the Web site. Accessing the Web site comprises rendering a page for the Web site. Analyzing the plurality of HTML documents comprises determining the JavaScript block count and the picture count of each of the HTML documents.

Another aspect of the present invention is a system for controlling access to a Web site. The system includes a network, a Web site and a local area network. The network is the Internet. The Web site is hosted at a first server and accessible over the Internet. The local area network includes a plurality of client-side devices and a security appliance. Each of the client side devices has a browser. The security appliance controls access to the Internet by each of the plurality of client-side devices. The security appliance has a service engine for analyzing a reputation vector for the Web site and generating a reputation index for the Web site from the reputation vector. The reputation vector is based on a plurality of factors for the Web site. The plurality of factors comprises at least one or more of country of domain registration, country of service hosting, country of an internet protocol address block, age of a domain registration, popularity rank, internet protocol address, number of hosts, top-level domain, a plurality of run-time behaviors, JavaScript block count, picture count, immediate redirect and response latency. Access to the Web site by any of the plurality of client-side devices is determined on the reputation index exceeding a threshold value established for the local area network.

Another aspect of the present invention is a method for controlling access to an Internet resource utilizing a reputation generating site. The method includes transmitting a request for an Internet resource from a browser for a client-side device of a local area network. The Internet resource resides at a first server. The method also includes receiving the request for the Internet resource at reputation generating site prior to transmission of the request over the Internet to the first server. The method also includes analyzing a reputation vector for the Internet resource at the reputation generating site. The reputation vector includes a plurality of dimensions for the Internet resource comprising at least two of country of domain registration, country of service hosting, country of an internet protocol address block, age of a domain registration, popularity rank, internet protocol address, number of hosts, to-level domain, a plurality of run-time behaviors, JavaScript block count, picture count, immediate redirect and response latency. The method also includes generating a reputation index for the Internet resource based on the analysis of the plurality of factors. The method also includes determining if the reputation index for the Internet resource is above a threshold value established for the local area network. The method also includes transmitting a decision transmission to the browser of the client-side device.

Another aspect of the present invention is a method for controlling access to an Internet resource. The method includes transmitting a request for an Internet resource from an Internet-enabled client application from a client-side device of a local area network. The Internet resource resides at a first server. The method also includes receiving the request for the Internet resource at a security appliance of the local area network prior to transmission of the request over the Internet. The method also includes determining if a reputation index for the Internet resource is at or above a threshold value established for the local area network. The reputation index is generated from a reputation vector for the Internet resource. The reputation vector comprises a plurality of factors for the Internet resource comprising security history, legitimacy, behavior, associations and location. The reputation index preferably resides in a database file at the security appliance, which is immediately accessible by the security appliance for determining whether or not to allow access to the Internet resource. Alternatively, the reputation index is generated in real-time at a data collection site accessible by the security appliance over the Internet, and the reputation index is forwarded to the security appliance from the data collection site upon request. The method also includes transmitting a decision transmission to the Internet-enabled client application of the client-side device. The decision transmission allows or denies access to the Internet resource.

Yet another aspect of the present invention is a method for controlling access to an Internet resource. The method includes transmitting a request for an Internet resource from a Web browser for a client-side device of a local area network. The Internet resource resides at a first server. The method also includes receiving the request for the Internet resource at a security appliance of the local area network prior to transmission of the request over the Internet. The method also includes constructing a reputation vector for the Internet resource at the security appliance. The reputation vector comprises a plurality of factors for the Internet resource comprising security history, legitimacy, behavior, associations and location. The method also includes analyzing the reputation vector to generate a reputation index for the Internet resource based on the analysis of the plurality of factors and the reputation classifier. The method also includes determining if the reputation index for the Internet resource is at or above a threshold value established for the local area network. The method also includes transmitting a decision transmission to the Web browser of the client-side device. The decision transmission allows or denies access to the Internet resource.

Yet another aspect of the present invention is a method for building a reputation database for Internet resources. The method includes collecting a plurality of factors for an Internet resource site to populate a reputation vector for the Internet resource to perform reputation analysis of the Internet resource. The method also includes receiving the plurality of factors for the Internet resource at a data collection site. The method also includes constructing a reputation vector for the Internet resource at the data collection site. The reputation vector comprises a plurality of factors for the Internet resource comprising security history, legitimacy, behavior, associations and location. The method also includes analyzing the reputation vector to generate a reputation index for the Internet resource based on the analysis of the plurality of factors and the reputation classifier. The method also includes storing the reputation index for the Internet resource at the data collection site. The method also includes transmitting the stored reputation index to a local area network upon request for managing access to the Internet resource.

The method further includes weighting each of the plurality of factors based on empirical knowledge of each of the plurality of factors. The method further includes obtaining the plurality of factors for the Internet resource using a crawler. Obtaining the plurality of factors for the Internet resource preferably comprises accessing the Internet service, analyzing a plurality of HTML documents for the Internet resource, and crawling a plurality of linked Internet resources of the plurality of HTML documents for Internet resource. Analyzing the plurality of HTML documents preferably comprises determining the JavaScript block count and the picture count of each of the HTML documents, browser hijacking, file downloads and a subject matter.

Yet another aspect of the present invention is a method for controlling access to an Internet resource. The method includes collecting a first plurality of Internet resource reputation vectors. The method also includes partitioning the first plurality of Internet resource reputation vectors into a plurality of training sets. The method also includes training a maximum entropy discrimination classifier with the plurality of training sets, the maximum entropy discrimination classifier trained for a specific local area network. The method also includes testing the trained maximum entropy discrimination classifier using a second plurality of Internet resource reputation vectors. Each of the second plurality of Internet resource reputation vectors is unknown to the trained maximum entropy discrimination classifier. The method also includes evaluating the tested maximum entropy discrimination classifier. The method also includes providing feedback to the evaluated maximum entropy discrimination classifier. The method also includes utilizing the reputation index at a local area network for managing access to an Internet resource.

Preferably, each of the first plurality of Internet resource reputation vectors comprises a plurality of dimensions for the Internet resource comprising security history, legitimacy, behavior, associations and location, and the method further comprises weighting each of the plurality of dimensions.

Yet another aspect of the present invention is a method for training a MED classifier for controlling access to an Internet resource. The method includes collecting a plurality of reputation vectors for Internet resources. The method also includes partitioning the plurality of reputation vectors into training sets. The method also includes training a MED classifier with the training sets. The method also includes testing the trained MED classifier against unknown Internet resources. The method also includes evaluating the trained MED classifier. The method also includes determining if the trained MED classifier has been adequately trained.

Having briefly described the present invention, the above and further objects, features and advantages thereof will be recognized by those skilled in the pertinent art from the following detailed description of the invention when taken in conjunction with the accompanying drawings.

BRIEF DESCRIPTION OF THE SEVERAL VIEWS OF THE DRAWINGS

FIG. 5 is a page for a local area network informing a requestor of the denial of access to a Web site.

DETAILED DESCRIPTION OF THE INVENTION

Figure 1:
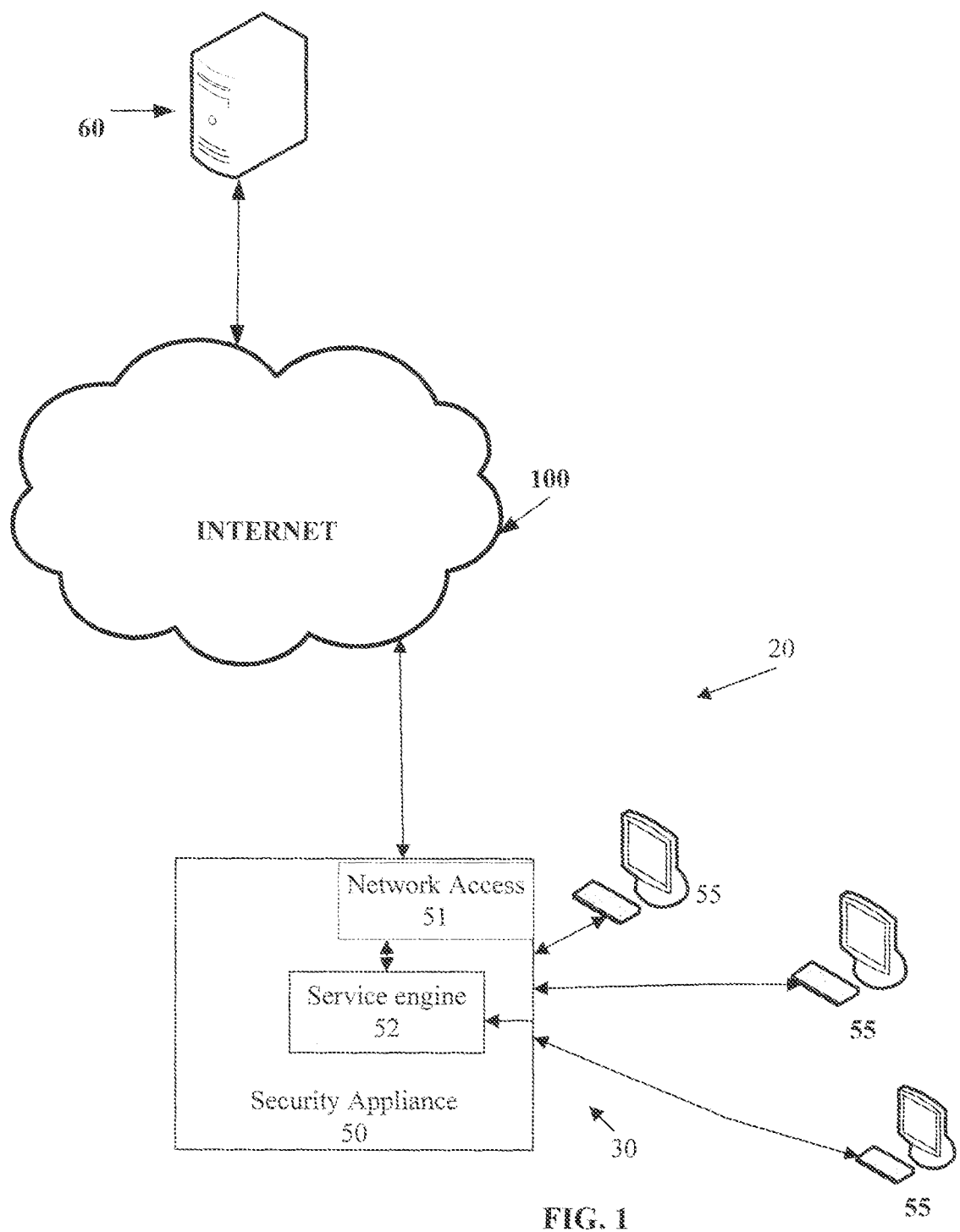
FIG. 1 is a block diagram of a system for controlling access to a Web site.

Reputation is a qualitative assessment of the safety of a website, expressed as a quantitative value that can be used in managing internet usage. Internet resources, such as Web sites, are safe, or of high reputation, if the Internet resource preferably has: a reputable ownership and registration; a consistent history; had consistent content during that history; associated with other high reputation sites; from a geographically safe region; the Internet service provider ("ISP") is well-known and reputable; not been known to be a source of malware infection; and worked cooperatively with the end-user and the end-user's Web browser application.

While security threats are transitory since they come up suddenly and are mitigated as quickly as possible, reputation is built up over a period of time and is a more enduring quality. Reputation can be lost, or become 'bad', over a period of time with repeated security events, bad associations, and bad behavior. For that reason, the occurrence of a single security breach (the site gets hacked and is a danger to visitors) does not dramatically lower the reputation of a site. Repeated occurrences over time, however, will destroy the reputation of the site.

Competitive reputation products include social considerations in their definitions, such that a highly reputable site, a site "held in high regard", preferably has these characteristics: established record of Web presence; not a source of network security risk; no introduction of malware; no popup ads; no persistent ad infection; is not pornographic or obscene; and has no illegal content.

The reputation of an Internet resource is preferably determined by security, legitimacy, behavior, geographic location, associations and additional factors. Legitimacy is determined by the top-level domain, the investment in the Internet resource (virtual hosting with non-affiliated sites, multiple hosting and SSL security), the traffic volume, the category age and the popularity rank. Legitimacy is also preferably determined by any or all of the following: the consistency between the registering and hosting city region or country; and city, region or country associated with the IP address. Behaviors include the use of popup ads, browser hijacking and the use of auto-redirecting. Associations include the number of sites linking into the site, the reputations of the linked in sites and the reputations of the linked-to sites. The geographic location includes the hosting country, the registration country, the region and the city. The geographic location also preferably includes the consistency between the registering and hosting country and the country associated with the IP address.

In a most preferred embodiment discussed below, machine learning technologies are utilized for controlling access to an Internet resource. A variation on support vector machine techniques called Maximum Entropy Discrimination ("MED") is a preferred machine learning technology. MED allows a computer to be trained to recognize the relative reputation of an Internet resource based on the features of the Internet resource. The set of features which characterize the reputation of the Internet resource is its reputation vector. Once trained, the computer uses the reputation vector for a requested Internet service to evaluate its reputation index, a score which can be used with empirically developed threshold values to block access where the reputation index is deemed to be too low to be safe.

A predictive security assessment for an Internet resource is provided based on known facts about the Internet resource, which is more secure than relying only on knowledge of previously experienced security attacks.

The system preferably provides classification of each Internet resource at run-time given a Uniform Resource Identifier (URI) and the reputation vector of the Internet resource. The system returns a score, or index, expressing the results on a relative scale for use by requesting clients, typically a security product which integrates the reputation assessment as a service.

The reputation vector preferably comprises a combination of some or all of the following: country of domain registration; country of service hosting; country of IP Address block; age of domain registration; time known to the assessor site; subject matter; classification age (time since last re-categorization); rank (popularity); IP Address; virtual hosting; number of hosts; top-level domain (.com, .biz, .ru, etc); security history; run-time behaviors; popup ads; downloadable executables; virus-infected executables; JavaScript block count; picture count; immediate redirect; and response latency. These features are collected and evaluated for all model training samples and at run-time on a per-user-request basis. Those skilled in the pertinent art will recognize that other factors may be utilized which are relevant to the security as determined by an assessor.

As shown in FIG. 1, a system for controlling access to an Internet service is generally designated 20. The system 20 preferably comprises a local area network 30, the Internet 100 and an Internet service located at a remote server 60. The Internet resource is preferably a Web site. A local area network 30 preferably comprises a security appliance 50 and a plurality of client-side devices 55. The plurality of client-side devices preferably comprises desktop computers, laptop computers, personal digital assistants, smartphones and the like. Each of the client-side devices 55 preferably has a Web-browser for accessing the Internet from the client side device 55. The security appliance 50 preferably comprises a network access 51 for permitting access to the Internet from the local area network 30, and a service engine 52 for determining if a requested Internet resource has a reputation index that meets a threshold established for the local area network 30.

Figure 3:
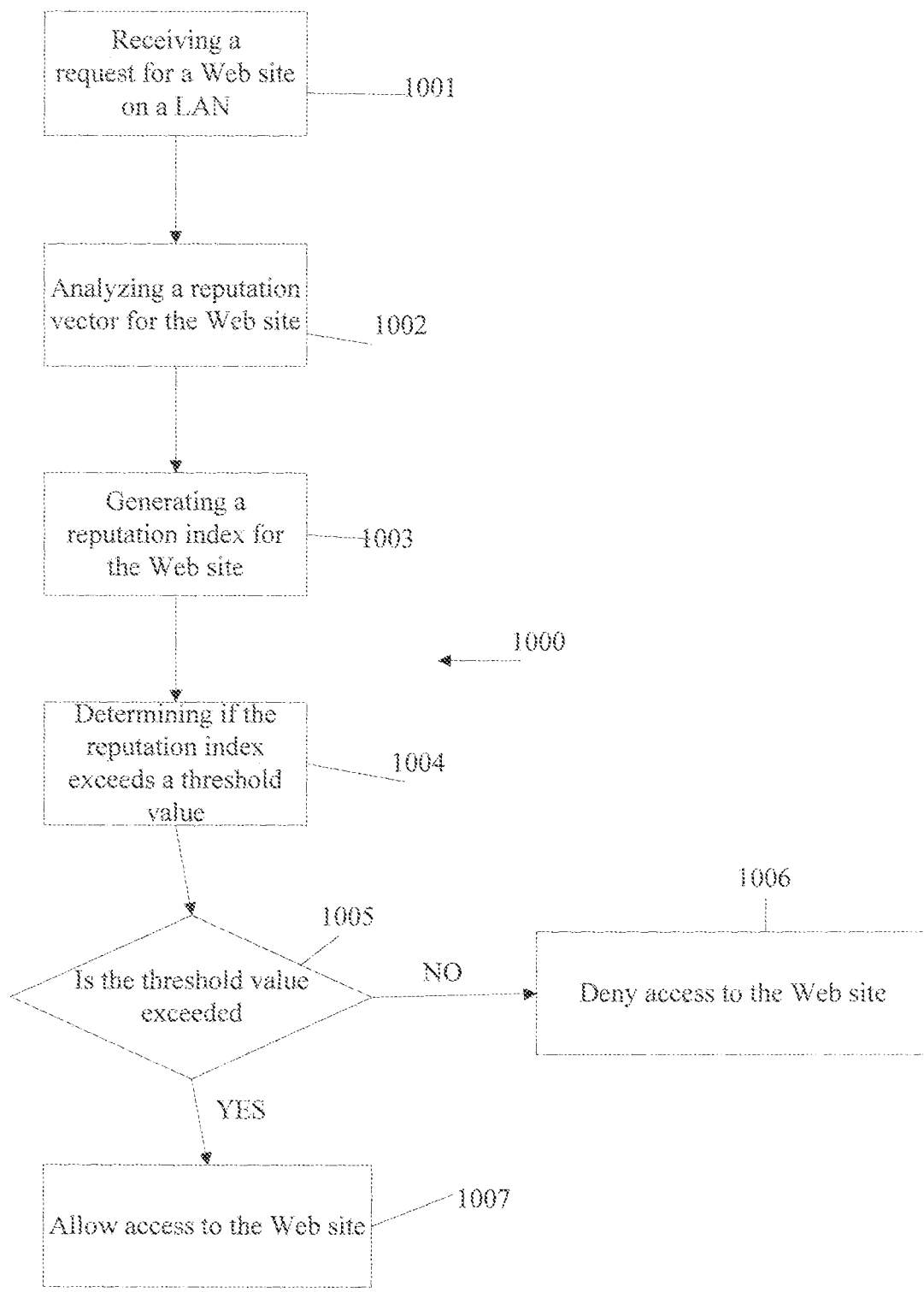
FIG. 3 is a flow chart of a method for controlling access to a Web site.
Figure 4:
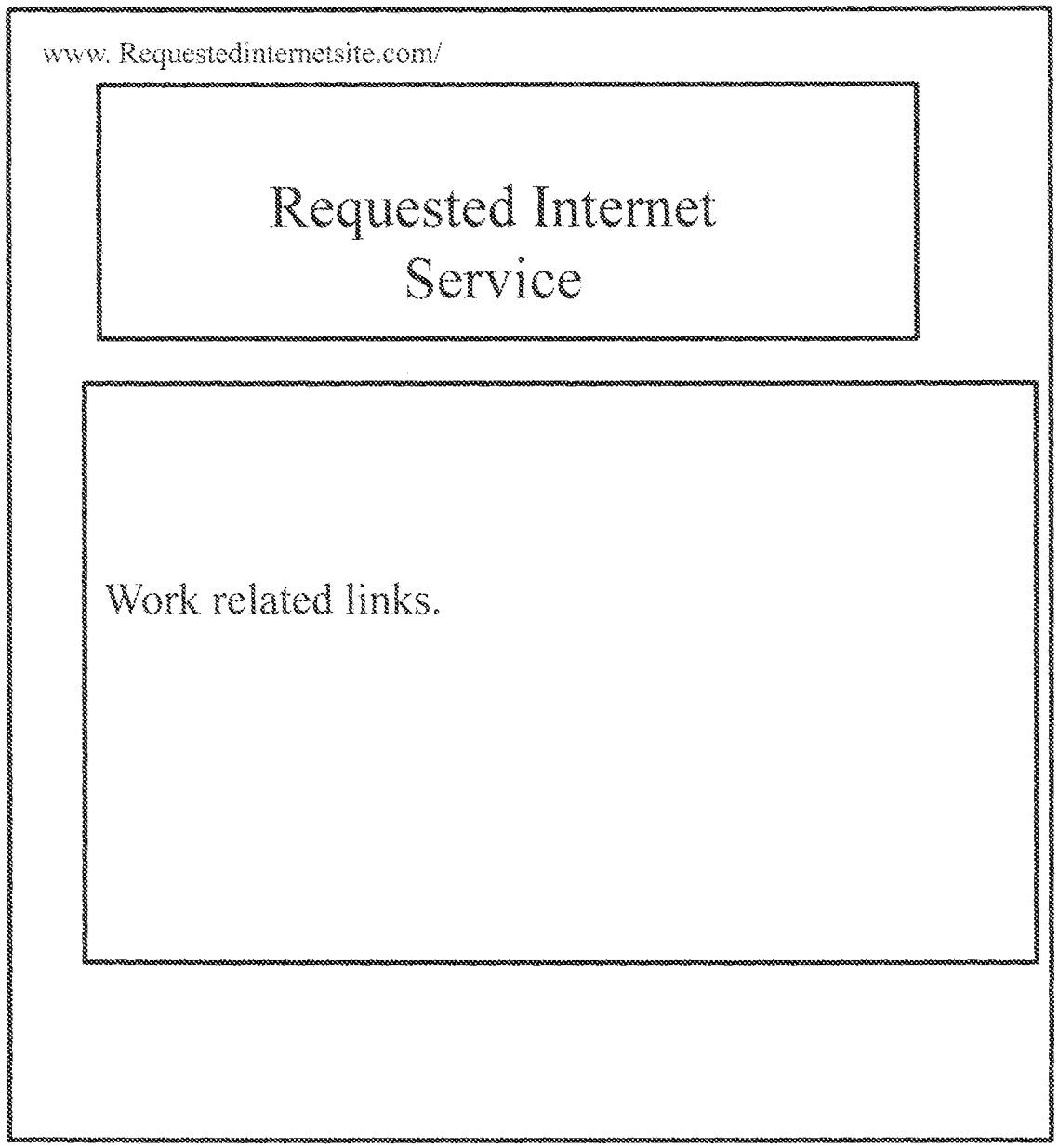
FIG. 4 is a Web page for a requested Web site.

A method 1000 for controlling access to a Web site is shown in FIG. 3. At block 1001, a request for a Web site is transmitted from a browser for a client-side device of a local area network which is received at a security appliance of the local area network prior to transmission of the request over the Internet. At block 1002, a reputation index for the Web site is obtained at the security appliance. The reputation index is calculated from a reputation vector which preferably includes a plurality of factors for the Web site comprising country of domain registration, country of service hosting, country of an internet protocol address block, age of a domain registration, popularity rank, internet protocol address, number of hosts, to-level domain, a plurality of run-time behaviors, JavaScript block count, picture count, immediate redirect and response latency. At block 1004, a determination is made if the reputation index for the Web site is above a threshold value established for the local area network. At decision 1005, if the reputation index is not above the threshold, then at block 1006 access to the Web site is denied and a transmission of the denial is sent to the client-side device, preferably as a page 500 as shown in FIG. 5. If at decision 1005 the reputation index for the Web site is above the threshold, then the access to the Web site by the client-side device is permitted by the security appliance, and preferably, as shown in FIG. 4, a Web page 400 is provided to the client-side device.

Figure 2:
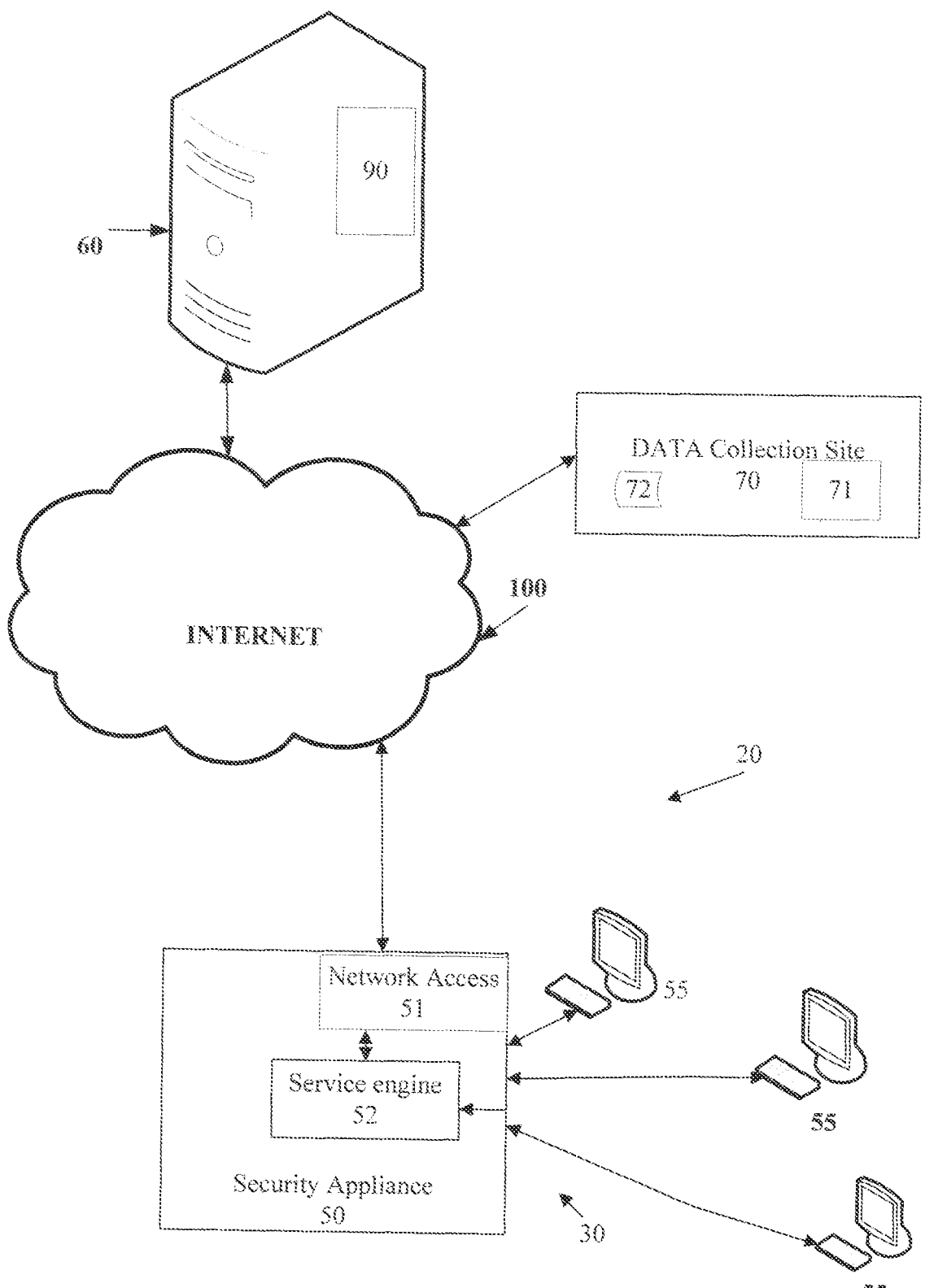
FIG. 2 is a block diagram of a system for controlling access to a Web site.

An alternative embodiment of the system 20 is illustrated in FIG. 2. The system 20 preferably comprises a local area network 30, the Internet 100, an Internet service located at a remote server 60 and a reputation generating site 70 preferably having a crawler 71 and a database 72. The Internet service is preferably a Web site. A local area network 30 preferably comprises a security appliance 50 and a plurality of client-side devices 55. Each of the client-side devices 55 preferably has a Web-browser for accessing the Internet from the client side device 55. The security appliance 50 preferably comprises a network access 51 for permitting access to the Internet from the local area network 30, and a service engine 52 for determining if a requested Internet service has a reputation index that meets a threshold establish for the local area network 30. The reputation generating site 70 provides reputation indices to service engine 52 of the security appliance 50. The reputation generating site 70 preferably utilizes the crawler 71 and other means to access Internet resources such as the Internet resource located at Web server 60. The other means preferably includes publicly available data feeds, purchased databases, proprietary database, zone files from WHOIS database.

Figure 6:
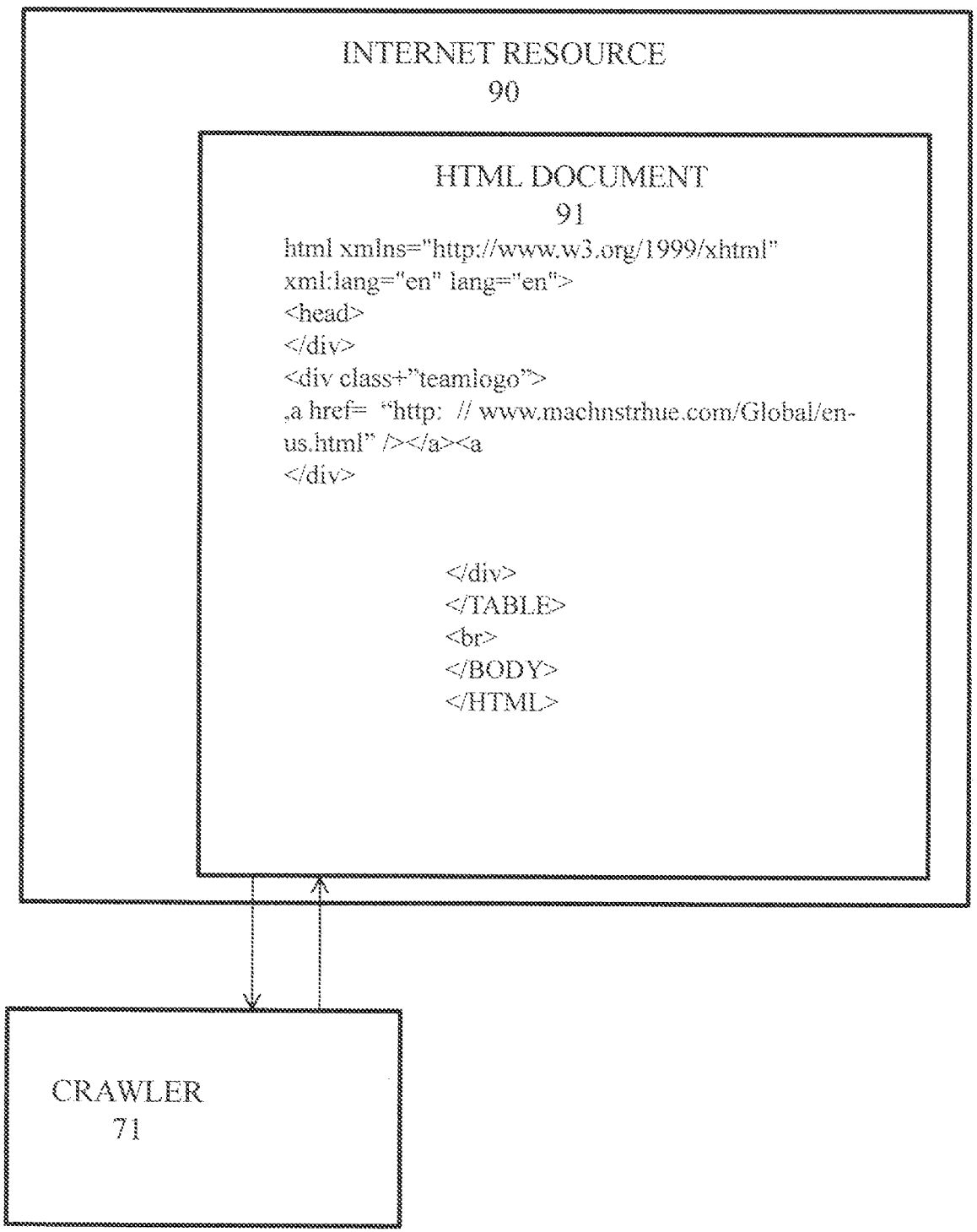
FIG. 6 is a block diagram of an Internet resource having a HTML document that is accessed by a crawler.
Figure 7:
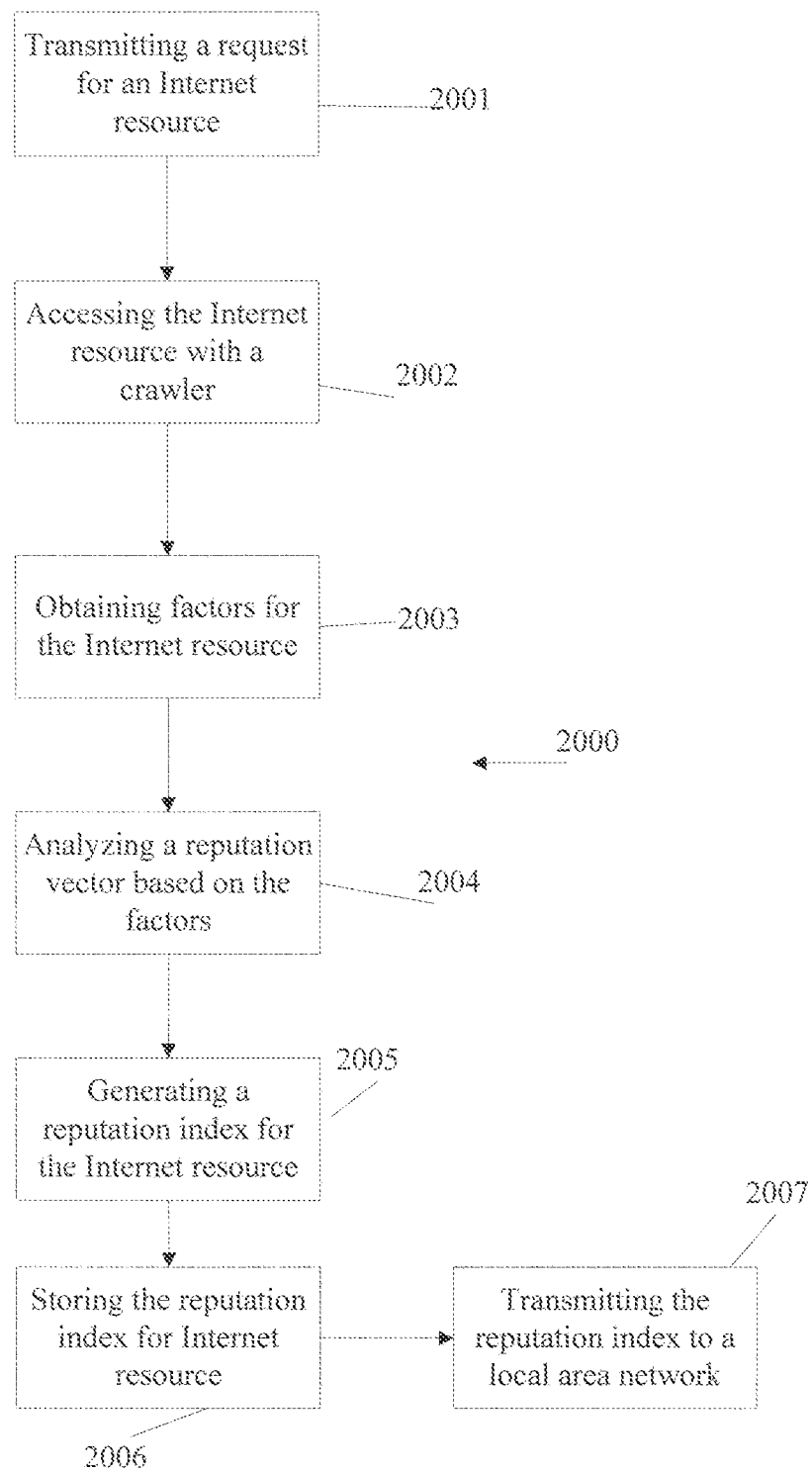
FIG. 7 is a flow chart of a method for generating a reputation index.

A flow chart for a method 2000 for generating a reputation index is shown in FIG. 7. At block 2001, a HTTP request is transmitted from a reputation generating site 70 for an Internet resource. From the HTTP request, a crawler 71 of the reputation generating site accesses the Internet resource. In accessing the Internet resource, as shown in FIG. 6, the crawler 71 preferably accesses at least one HTML document 91 of a plurality of HTML documents of the Internet resource 90. At block 2003, from the HTML documents and links within the HTML documents, the crawler 71 obtains information concerning the Internet resource 90. The reputation vector for the Internet resource 90 is based on some of this information obtained by the crawler 71. At block 2004, the reputation vector for the Internet resource is analyzed at the reputation generating site 70. At block 2005, a reputation index for the Internet resource 90 is generated at the data collection site. At block 2006, the reputation index for the Internet resource 90 is stored in a database 72 of the reputation generating site 70. The reputation for the Internet resource is available to the security appliance as updates or individual requests. At block 2007, the reputation index for the Internet resource 90 is transmitted to a LAN 30 for storage in a service engine 52 of a security appliance 50.

Figure 8:
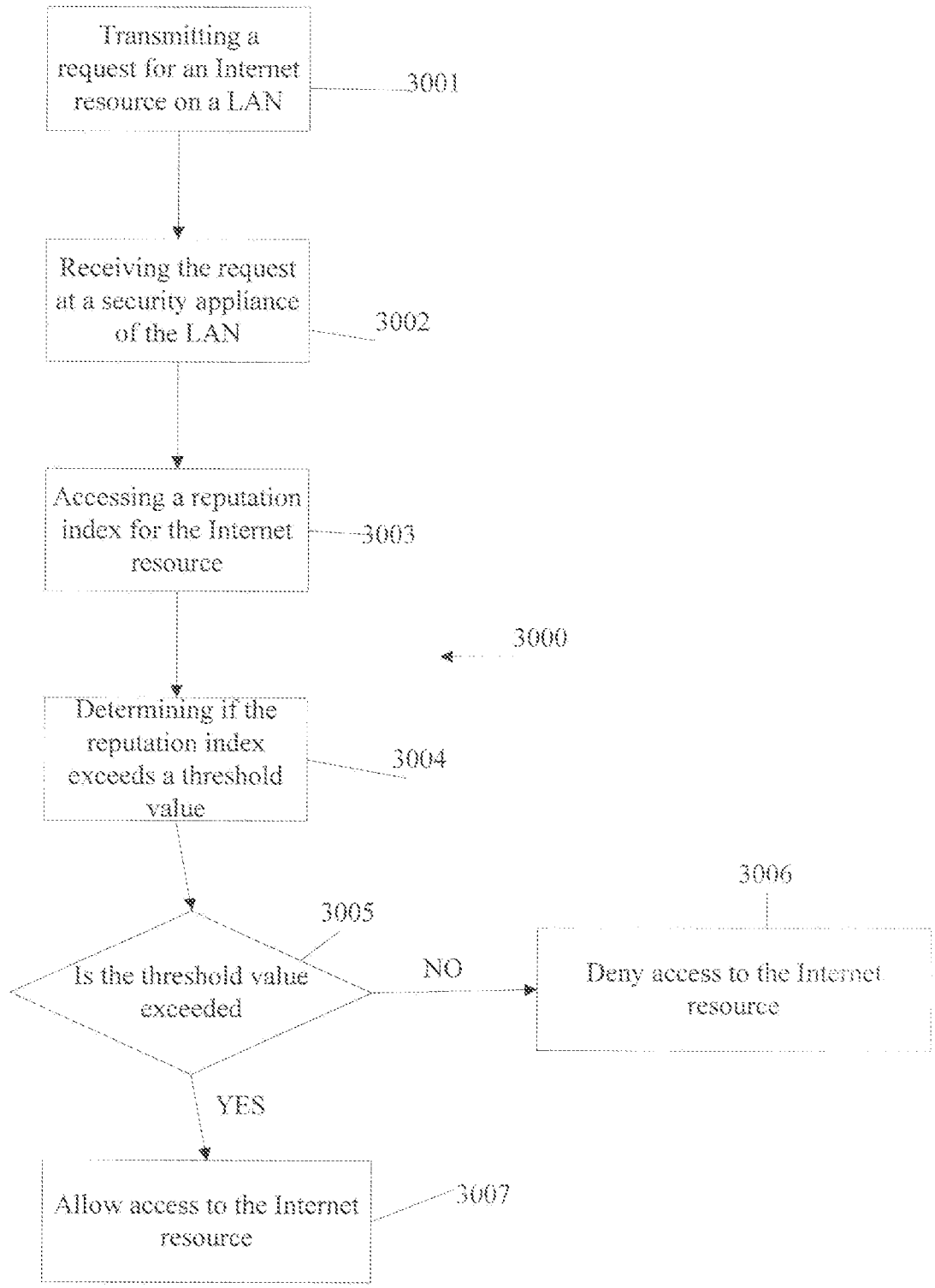
FIG. 8 is a flow chart of a method for controlling access to an Internet resource.

A flow chart for a method 3000 for controlling access to an Internet resource is shown in FIG. 8. At block 3001, a request for an Internet resource is transmitted from an Internet-enabled client application for a client-side device 55 of a LAN 30. At block 3002, the request is received at a security appliance 50 of the LAN 30 prior to transmission of the request over the Internet 100. At block 3003, a reputation index for the Internet resource is accessed from a database of a service engine 52 of the security appliance 50. The reputation index is based on a reputation vector which includes a plurality of factors for the Internet resource comprising at least two or more of country of domain registration, country of service hosting, country of an internet protocol address block, age of a domain registration, security history, popularity rank, internet protocol address, number of hosts, to-level domain, a plurality of run-time behaviors, JavaScript block count, picture count, immediate redirect and response latency. At block 3004, a determination is made if the reputation index for the Internet resource is at or above a threshold value established for the LAN 30. At decision 3005, if the reputation index is below the threshold value, then at block 3006 access to the Internet resource is denied and a transmission of the denial is sent to the client-side device 55. If at decision 3005 the reputation index for the Web site is at or above the threshold value, then the access to the Internet resource by the client-side device 55 is permitted by the security appliance 50.

Table One provides a list of the attributes for the reputation vector and a description of each of the attributes.

TABLE ONE

| Attribute | Description |
| --- | --- |
| Country | 2-letter code, 3-letter code or full name of country based on IP block |
| Top-level Domain | .com, .biz, .org, .gov, etc. |
| Domain Age | Number of months in existence on zone lists, or no less than the classification age |
| Database Age | Months since Authority was entered into database |
| Classification Age | Months that the Authority has held its current classification |
| Hosts | Number of IP's associated with the Authority |
| Virtually Hosted | T/F if the other authorities share associated IP's |
| Popups | T/F if the page opens new browser windows on its own |
| Hijack | T/F does the default page alter the browser configuration |
| JavaScript | Count of <SCRIPT> blocks in default pages |
| Executables | T/F does the authorities download executables to client |
| Pictures | Count of pictures on default page |
| Latency | Number of milliseconds to return default page |
| Rank | Numerical ranking, used as T if <2,000,000, F otherwise in modeling |
| Infected | T/F were infected download files found by AV tools during site analysis |
| Security Trend | Number of malware infections in past 12 months |
| Total Security Count | Total number of malware infections known |
| Redirect | Authority redirects to another Authority |
| IP Address | Analysis of IP address for known threat sources, reserved IP ranges, and legacy IP address assignments |
| ISP | Internet service provider |
| City | |
| Region | |

Table Two is an example of a "good" Internet resource.

TABLE TWO

| Attribute | Value |
| --- | --- |
| Authority | USmoney.gov |
| Country | USA |
| Top Level Domain | Gov |
| Domain Age | 18 |
| Hosts | 2 |
| Virtual Hosts | 0 |
| Rank | 1 |
| Infected | 0 |
| Security Events | 0 |
| Recent Events | 0 |
| PublicCoIP | 0 |
| GovernmentIP | 1 |
| Hijack | 0 |
| JavaScript | 0 |
| Executables | 0 |
| Pictures | 0 |
| Latency | 0 |
| Redirect | 0 |

Table Three is an example of a "bad" Internet resource.

TABLE THREE

| Attribute | Value |
| --- | --- |
| Authority | www.c.reditcan.cn |
| Country | CN |
| Top Level Domain | CN |
| Domain Age | 3 |
| Hosts | 1 |
| Virtual Hosts | 1 |

TABLE THREE-continued

| Attribute | Value |
| --- | --- |
| Rank | 0 |
| Infected | 0 |
| Security Events | 1 |
| Recent Events | 1 |
| PublicCoIP | 0 |
| GovernmentIP | 0 |
| Hijack | 0 |
| JavaScript | 13 |
| Executables | 1 |
| Pictures | 14 |
| Latency | 826 |
| Redirect | 0 |

Depending on the threshold value established by the administrator of the LAN, the Internet resource of www.c.reditcan.cn with an reputation index value of 51, is not available for access by a user based on its reputation index, and the Internet resource of www.USmoney.GOV is available for access by a user based on its reputation index 95. Thus, even if the Internet resource of www.c.reditcan.cn is not a known source of malware or viruses, the present invention would prevent an end user client from accessing the Internet resource since its reputation index is deemed unsafe.

Another embodiment uses a MED algorithm to build a statistical model on a Web page based on good and bad Internet samples. This embodiment uses a unique optimization algorithm for training, as well as two other optimization steps for calibrating the outputs to be probabilities, in a process that tolerates some input errors while still yielding reliable outputs. Training process feedback loops guide the implementer to improve the model data through splitting data into sets for holdout, training, and testing guided by two criteria: most violating examples, and least understood examples. The implementer using the criteria iteratively improves the quality of the training set which also reduces classifier errors and is exponentially faster than having the implementer manually verify or check the example assignments to categories in random or haphazard order. The examples are randomly reassigned before every training iteration to improve generalization. Sparse matrix math during the classification process improves processing speeds to enable a modest computer to classify millions of URLs per day. The implementation allows for a multiple of dimensions, each representing a fact about the Internet resource, to be included in the reputation model, while classification speed of any particular Internet resource is independent of the number of total dimensions in its reputation vector.

This embodiment is preferred since classifying a large percentage of existing Web sites into reputation risk assessments quickly and efficiently requires an automated process because the number of humans required is too large to be practical or economical. Further, defining automated classification rules by hand is very hard and requires writing many thousands of extremely specific as well as vague rules. All of these rules will interact with each other in an exponential number of ways, making human-based rule construction a daunting effort as well. The machine learning approach of this embodiment solves the problem by having humans define "training sets" or examples of each topic for the classifier, which then "trains" by optimizing the weights each factor should have in order to reduce classification error the most.

In addition to providing a good implementation of the learning algorithm, this embodiment efficiently utilizes the human efforts in identifying examples of good and bad reputations.

This embodiment preferably applies an effective learning formulation based on the principles and theory of MED with an efficient optimization algorithm based on the principles of Platt's sequential minimization optimization ("SMO"), in conjunction with an overall optimization of tunable parameters and calibrated confidence scores, to solve the learning problem given proper examples of Web sites of good and bad reputation.

The process then involves having humans examine a list of "most violating" examples, the examples which were marked as being good reputations but received extremely low confidence scores from the classifier (and vice-versa), as well as "least understood" examples, the examples which receive a confidence score close to the prior probability of the reputation.

By spending human time examining these two classes of examples, the classifier benefits from having egregiously misclassified examples being put into the proper reputation (good or bad) as well as providing the classifier with the largest amount of new information as quickly as possible. This combination improves the classifier's real-world effectiveness very quickly with minimal human effort. Thus, this embodiment efficiently combines human and automated work to solve the problem of automated reputation classification of Internet resources.

In one method, an evaluation of multiple factors (such as discussed above) is included in determining a reputation vector for an Internet resource. This process is done for multiple Internet resources. Next, reputation vectors for a large sample of Internet resources are collected at a data collection site. Next, a MED classifier is trained using the collection of reputation vectors based on training sets of known high reputation Internet resources and low reputation Internet resources. Next, a MED-based model for classification is tested against a wide variety of random samples of Internet resources. Next, a security appliance is deployed at a LAN. Next, a run-time evaluation of Internet resource requests is performed in using the developed MED classifier for responding to reputation index information requests from clients based on a LAN security policy. The MED-based model for classification is preferably utilized at run-time to calculate a reputation index. In this manner, this embodiment provides a predictive security assessment based on known facts about an Internet resource, which is more secure than relying only on knowledge of previously experienced security attacks. This embodiment provides a LAN real-time updates, real-time classification of non-cached URLs and a real-time feedback loop.

Figure 9:
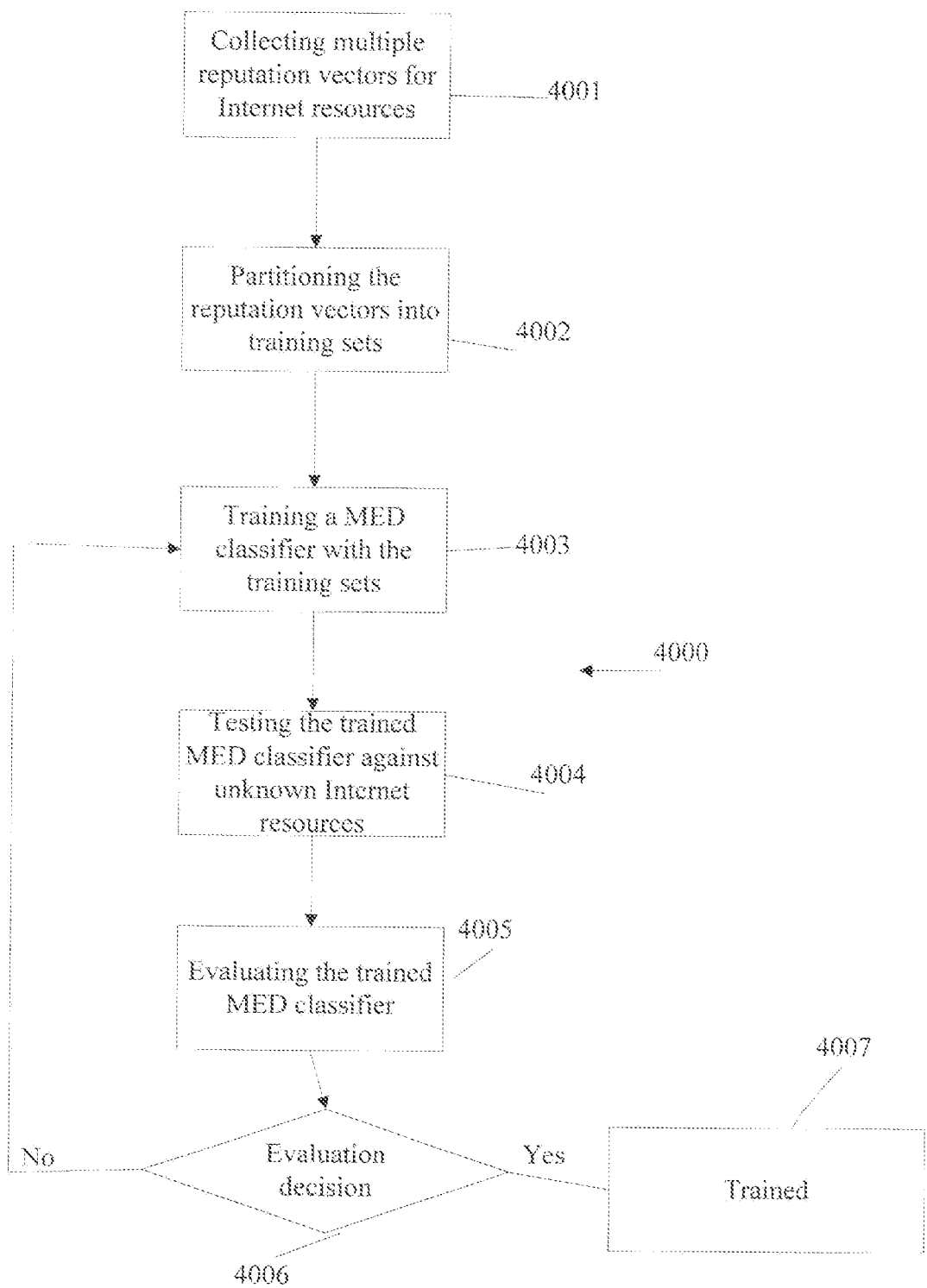
FIG. 9 is a flow chart of a method for utilizing a MED classifier for controlling access to an Internet resource.

A flow chart of a method 4000 for utilizing a MED classifier for controlling access to an Internet resource is shown in FIG. 9. At block 4001, multiple reputation vectors for a large sample of Internet resources are collected preferably at a reputation generating site. The reputation vectors for the Internet resources are previously generated as discussed above. At block 4002, the reputation vectors are partitioned into multiple training sets. The training sets comprise at least two training sets divided into high reputation Internet resources and low reputation Internet resources. At block 4003, a MED classifier is trained using the training sets of high reputation Internet resources and low reputation Internet resources to create a trained MED classifier. At block 4004, the trained MED classifier is tested against a wide variety of Internet resources which are not grouped into training sets and the reputation index is unknown to the trained MED classifier. At block 4005, the tested MED classifier is evaluated to determine the accuracy of the tested MED classifier and to determine the most violating examples of either a wrongly categorized high reputation Internet resource or low reputation Internet resource, and the least understood Internet resources. At decision block 4006, an evaluation of the testing is performed. If the testing was performed correctly, then at block 4007 the MED classifier is considered trained and ready for operations. If the testing was inadequate feedback is provided to the MED classifier concerning the wrongly categorized high reputation Internet resources or low reputation Internet resources, and the least understood Internet resources. The process is continued at block 4003 again until the MED classifier is properly trained.

Figure 10:
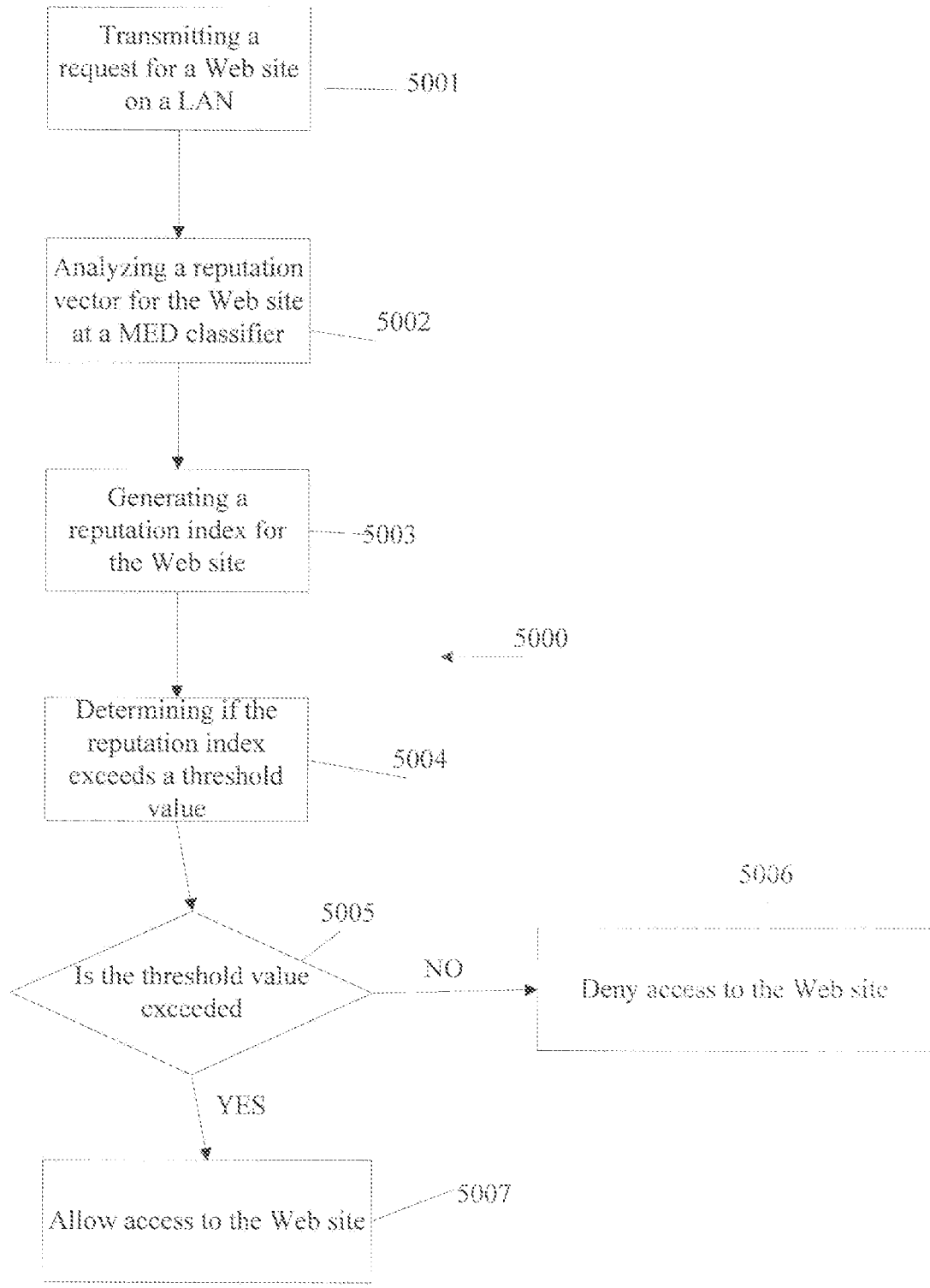
FIG. 10 is flow chart of a method for controlling access to an Internet resource utilizing a MED classifier.

In another embodiment, a reputation index is returned immediately from a stored set of reputation indexes calculated prior to the user's request. As shown in FIG. 10, a method for controlling access to an Internet resource utilizing a MED classifier is generally designated 5000. At block 5001, a request for an Internet resource is transmitted from an Internet-enabled client application for a client-side device 55 of a LAN 30. At block 5002, a reputation vector for the Internet resource is analyzed preferably at a MED classifier or at a security appliance for the LAN. At block 5003, a reputation index for the Internet resource is accessed/generated from a database of a service engine 52 of the security appliance 50. The reputation index is preferably based on a reputation vector which includes a plurality of factors for the Internet resource comprising at least two or more of country of domain registration, country of service hosting, country of an internet protocol address block, age of a domain registration, security history, popularity rank, internet protocol address, number of hosts, to-level domain, a plurality of run-time behaviors, JavaScript block count, picture count, immediate redirect and response latency. At block 5004, a determination is made if the reputation index for the Internet resource is at or above a threshold value established for the LAN 30. At decision 5005, if the reputation index is below the threshold value, then at block 5006 access to the Internet resource is denied and a transmission of the denial is sent to the client-side device 55. If at decision 5005 the reputation index for the Web site is at or above the threshold value, then the access to the Internet resource by the client-side device 55 is permitted by the security appliance 50. In such an embodiment, a pre-calculated reputation index residing on the LAN or quickly available to the security appliance of the LAN provides for a much faster response (if not immediate response) as to the accessibility of the Internet resource.

Figure 11:
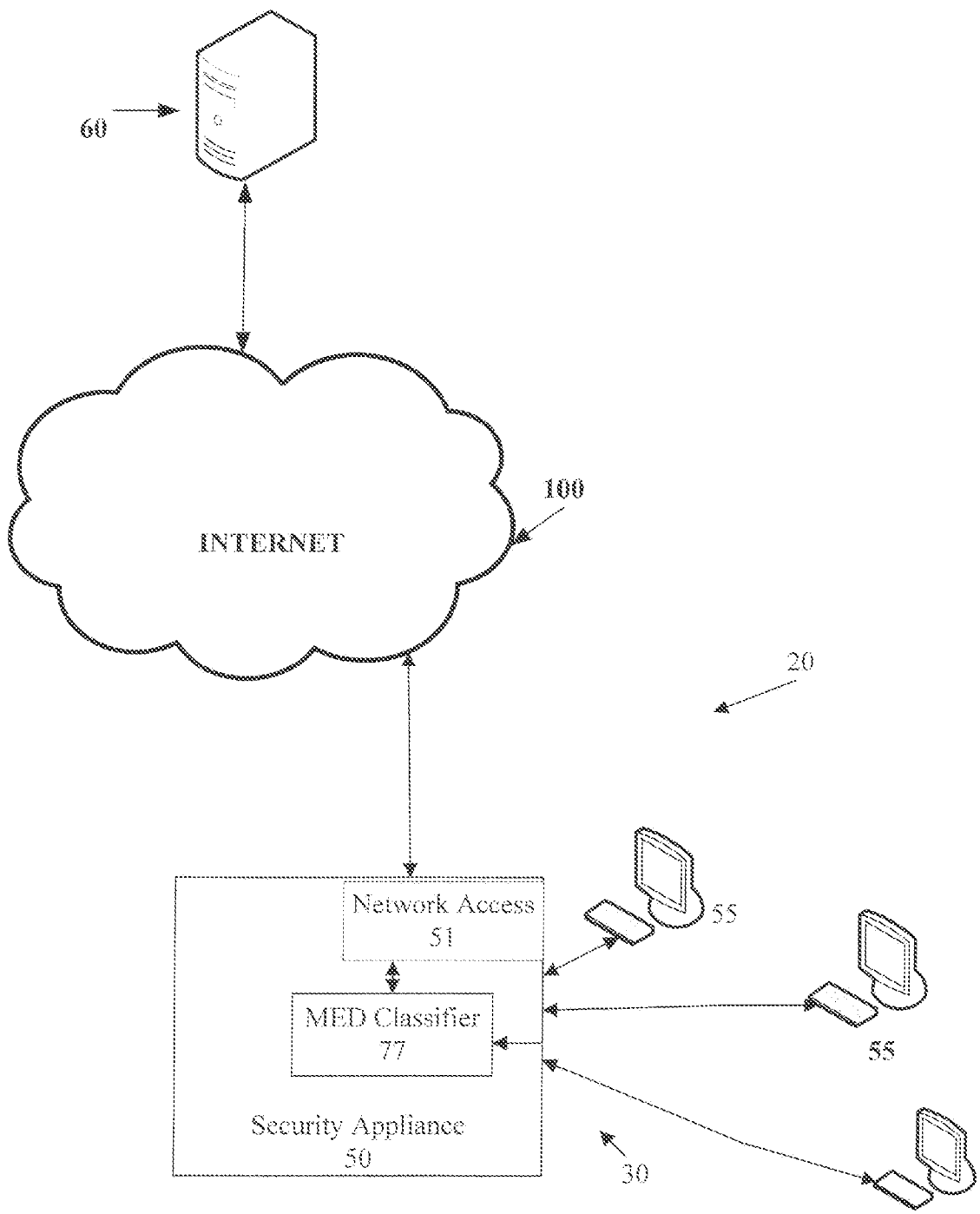
FIG. 11 is a block diagram of a system for utilizing a MED classifier for controlling access to an Internet resource.

FIG. 11 illustrates a system 20 for controlling access to an Internet resource utilizing a MED classifier site 77. The system 20 preferably comprises a local area network 30, the Internet 100, a MED classifier site 77, and an Internet service located at a remote server 60. The Internet resource is preferably a Web site. A local area network 30 preferably comprises a security appliance 50 and a plurality of client-side devices 55. Each of the client-side devices 55 preferably has a Web-browser for accessing the Internet from the client side device 55. The security appliance 50 preferably comprises a network access 51 for permitting access to the Internet from the local area network 30, based on data from the MED classifier site 77, which determines if a requested Internet resource has a reputation index that meets a threshold establish for the local area network 30.

Table Four provides an example of some dimensions and the sorted model weights of the MED classifier.

TABLE FOUR

| Identification | Dimension | Sorted Model weights |
| --- | --- | --- |
| 1966272070 | Domain age | 3.785360 |
| 2307717 | gov | 1.969750 |
| 1906396306 | paris | 0.647784 |
| 1477426223 | Hijack | −19.887100 |

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

We claim as our invention:

1. A method for classifying an Internet resource, the method comprising:

receiving a plurality of reputation vectors for a plurality of Internet resources, each reputation vector comprising a plurality of reputation factors for an associated Internet resource, the plurality of reputation factors for the associated Internet resource including a virtual hosting factor for the associated Internet resource, an assessor site time known for the associated Internet resource and a classification age for the associated Internet resource, the virtual hosting factor for the associated Internet resource indicating whether other authorities than a first authority associated with the associated Internet resource share an IP address associated with the first authority, the assessor site time known for the associated Internet resource indicating how long the associated Internet resource has been known to an assessor site and the classification age indicating how long the associated Internet resource has held a reputation classification;

partitioning the plurality of reputation vectors into one or more training sets;

training a classifier using the one or more training sets;

performing a predictive security assessment of a first Internet resource, by a reputation generating site, based on known facts about the first Internet resource, the performing the predictive security assessment further comprising:

accessing, at the reputation generating site, one or more HyperText Markup Language (HTML) documents of the first Internet resource;

obtaining a plurality of reputation factors of the one or more HTML documents of the first Internet resource, the plurality of reputation factors of the one or more HTML documents including a virtual hosting factor for the first Internet resource, a classification age of the first Internet resource and an assessor site time known for the first Internet resource, the virtual hosting factor for the first Internet resource indicating whether other authorities than a second authority associated with the first Internet resource share an IP address associated with the second authority;

weighting each of the plurality of reputation factors of the one or more HTML documents based on empirical knowledge of each of the plurality of reputation factors;

analyzing, at the reputation generating site, a reputation vector of the first Internet resource, the reputation vector based on the plurality of reputation factors of the one or more HTML documents;

calculating, at the reputation generating site, using the classifier, a calculated reputation index score for the first Internet resource in real-time using, as input to the classifier, the reputation vector based on the plurality of reputation factors of the one or more HTML documents, including the virtual hosting factor for the first Internet resource, the classification age for the first Internet resource and the assessor site time known for the first Internet resource; and storing, in a data store at the reputation generating site, the calculated reputation index score for the first Internet resource;

transmitting the calculated reputation index score to a local area network of a security appliance;

at the local area network, controlling access to the first Internet resource, the controlling access further comprising:

receiving, by the security appliance, a request for the first Internet resource from a client device over the local area network;

accessing, by the security appliance, the calculated reputation index score;

comparing the calculated reputation index score to a security policy of the local area network, wherein the security policy comprises a threshold reputation index score established for the local area network for denying access to the plurality of the Internet resources; and when the calculated reputation index score for the first Internet resource is less than the threshold reputation index score, denying access to the first Internet resource.

2. The method according to claim 1, wherein the plurality of reputation factors for the associated Internet resource comprises one or more of a security history factor, a legitimacy factor, a behavior factor, an association factor, and a location factor.

3. The method of claim 2, wherein the location factor of the plurality of reputation factors for the associated Internet resource comprises at least one of: country of domain registration, country of service hosting and country of an internet protocol address block; and wherein the legitimacy factor of the plurality of reputation factors for the associated Internet resource comprises at least one of: age of a domain registration, popularity rank, internet protocol address, number of hosts, top-level domain; and wherein the behavior factor of the plurality of reputation factors for the associated Internet resource comprises at least one of: plurality of run-time behaviors, script block count, picture count, immediate redirect and response latency.

4. The method of claim 1, wherein the first Internet resource comprises a Uniform Resource Identifier.

5. The method of claim 1, further comprising:

transmitting the calculated reputation index score to the security appliance.

6. The method of claim 1, wherein the plurality of reputation factors for the associated Internet resource comprises a number of hosts factor for the associated Internet resource and the plurality of reputation factors of the one or more HTML documents comprises a number of hosts factor for the first Internet resource.

7. The method of claim 1, wherein the plurality of reputation factors for the associated Internet resource comprises a latency factor for the associated Internet resource and the plurality of reputation factors of the one or more HTML documents comprises a latency factor for the first Internet resource.

8. A method for classifying an Internet resource, the method comprising:

receiving a plurality of reputation vectors for a plurality of Internet resources, each reputation vector comprising a plurality of reputation factors for an associated Internet resource from the plurality of Internet resources, the plurality of reputation factors for the associated Internet resource including a virtual hosting factor for the associated Internet resource, the virtual hosting factor for the associated Internet resource indicating whether other authorities than a first authority associated with the associated Internet resource share an IP address associated with the first authority, the assessor site time known for the associated Internet resource and a classification age for the associated Internet resource, an assessor site time known for the associated Internet resource indicating how long the associated Internet resource has been known to an assessor site and the classification age indicating how long the associated Internet resource has held a reputation classification;

partitioning the plurality of reputation vectors into one or more training sets, the one or more training sets comprising one or more of high reputation Internet resources and low reputation Internet resources;

training a maximum entropy discrimination (MED) classifier with the one or more training sets;

performing a predictive security assessment of a first Internet resource, by a reputation generating site, based on known facts about the first Internet resource, the performing the predictive security assessment further comprising:

accessing, at the reputation generating site, one or more HyperText Markup Language (HTML) documents of the first Internet resource;

obtaining a plurality of reputation factors of the one or more HTML documents of the first Internet resource, the plurality of reputation factors of the one or more HTML documents including a virtual hosting factor for the first Internet resource, a classification age of the first Internet resource and an assessor site time known for the first Internet resource, the virtual hosting factor for the first Internet resource indicating whether other authorities than a second authority associated with the first Internet resource share an IP address associated with the second authority;

weighting each of the plurality of reputation factors of the one or more HTML documents based on empirical knowledge of each of the plurality of reputation factors;

analyzing, at the reputation generating site, a reputation vector of the first Internet resource, the reputation vector based on the plurality of reputation factors of the one or more HTML documents;

calculating, at the reputation generating site, using the MED classifier, a calculated reputation index score for the first Internet resource using, as input to the MED classifier, the reputation vector based on the plurality of reputation factors of the one or more HTML documents, including the virtual hosting factor for the first Internet resource, the classification age for the first Internet resource and the assessor site time known for the first Internet resource;

storing, in a data store at the reputation generating site, the calculated reputation index score for the first Internet resource; and transmitting the calculated reputation index score to a local area network of a security appliance;

at the local area network, controlling access to the first Internet resource, the controlling access further comprising:

receiving, by the security appliance, a request for the first Internet resource from a client device over the local area network;

accessing, by the security appliance, the calculated reputation index score;

comparing the calculated reputation index score to a security policy of the local area network, wherein the security policy comprises a threshold reputation index score established for the local area network for denying access to the plurality of the Internet resources; and when the calculated reputation index score for the first Internet resource is less than the threshold reputation index score, denying access to the first Internet resource.

9. The method according to claim 8, wherein the plurality of reputation factors for the associated Internet resource comprises one or more of a security history factor, a legitimacy factor, a behavior factor, an association factor, and a location factor.

10. The method of claim 9, wherein the location factor of the plurality of reputation factors for the associated Internet resource comprises at least one of: country of domain registration, country of service hosting and country of an internet protocol address block; and wherein the legitimacy factor of the plurality of reputation factors for the associated Internet resource comprises at least one of: age of a domain registration, popularity rank, internet protocol address, number of hosts, top-level domain; and wherein the behavior factor of the plurality of reputation factors for the associated Internet resource comprises at least one of: plurality of run-time behaviors, script block count, picture count, immediate redirect and response latency.

11. The method of claim 8, wherein the MED classifier is created for the local area network.

12. The method of claim 8, wherein the first Internet resource comprises a Uniform Resource Identifier.

13. The method according to claim 8, wherein the MED classifier is trained to classify Internet resources based on a plurality of reputations, the plurality of reputations including a high reputation and a low reputation and wherein training the MED classifier further comprises:

identifying a first set of Internet resources that are marked as high reputation Internet resources, but received confidence scores by the MED classifier that were below a confidence score threshold;

identifying a second set of Internet resources that are marked as low reputation Internet resources, but received confidence scores by the MED classifier that were below the confidence score threshold; and examining the first and second sets of Internet resources to reclassify the first and second sets of Internet resources into proper reputation classifications.

14. The method according to claim 13, wherein training the MED classifier further comprises:

identifying a third set of Internet resources based on a confidence score received by each from the MED classifier and a prior probability of a reputation from the plurality of reputations; and examining the third set of Internet resources.

15. The method according to claim 13, wherein examining the first and second sets of Internet resources is performed using human intervention.

16. The method of claim 8, wherein the plurality of reputation factors for the associated Internet resource comprises a number of hosts factor for the associated Internet resource and the plurality of reputation factors of the one or more HTML documents comprises a number of hosts factor for the first Internet resource.

17. The method of claim 8, wherein the plurality of reputation factors for the associated Internet resource comprises a latency factor for the associated Internet resource and the plurality of reputation factors of the one or more HTML documents comprises a latency factor for the first Internet resource.

18. A system for classifying an Internet resource, the system comprising:

a reputation site including one or more servers; and a maximum entropy discrimination (MED) classifier, the MED classifier comprising instructions that when executed by the one or more servers, cause the MED classifier to perform operations comprising:

receive a plurality of reputation vectors for a plurality of Internet resources, each reputation vector comprising a plurality of reputation factors for an associated Internet resource from the plurality of Internet resources, the plurality of reputation factors for the associated Internet resource including a virtual hosting factor for the associated Internet resource, a reputation site time known for the associated Internet resource and a classification age for the associated Internet resource, the virtual hosting factor for the associated Internet resource indicating whether other authorities than a first authority associated with the associated Internet resource share an IP address associated with the first authority, the reputation site time known for the associated Internet resource indicating how long the associated Internet resource has been known to the reputation site and the classification age indicating how long the associated Internet resource has held a classification assigned by the reputation site;

partition the plurality of reputation vectors into one or more training sets, the one or more training sets comprising one or more of high reputation Internet resources and low reputation Internet resources; and train the maximum entropy discrimination (MED) classifier with the one or more training sets; and wherein the one or more servers of the reputation site are configured to perform a predictive security assessment of a first Internet resource based on known facts about the first Internet resource, the predictive security assessment further comprising:

receive a reputation vector comprising a plurality of obtained factors for the first Internet resource, the plurality of obtained factors including a virtual hosting factor for the first Internet resource, a classification age of the first Internet resource and a reputation site time known for the first Internet resource, the virtual hosting factor for the first Internet resource indicating whether other authorities than a second authority associated with the first Internet resource share an IP address associated with the second authority;
- calculate a calculated reputation index score for the internet resource based on the reputation vector using the MED classifier, and
- store, in a data store at the reputation site, the calculated reputation index score for the first Internet resource; and
- transmit the calculated reputation index score to a local area network of a security appliance;

at the local area network, control access to the first Internet resource, the controlling access further comprising:
- receive, by the security appliance, a request for the first Internet resource from a client device over the local area network;
- access, by the security appliance, the calculated reputation index score; and
- determine denial of access to the Internet resource based on a comparison of the calculated reputation index score and a security policy of the local area network, wherein the security policy comprises a threshold reputation index score established for the local area network for denying access to the plurality of the Internet resources.

19. The system of claim 18, wherein the plurality of reputation factors for the associated Internet resource comprises one or more of a security history factor, a legitimacy factor, a behavior factor, an association factor, and a location factor.

20. The system of claim 19, wherein the location factor of the plurality of reputation factors for the associated Internet resource comprises at least one of: country of domain registration, country of service hosting and country of an internet protocol address block; and
- wherein the legitimacy factor of the plurality of reputation factors for the associated Internet resource comprises at least one of: age of a domain registration, popularity rank, internet protocol address, number of hosts, top-level domain; and
- wherein the behavior factor of the plurality of reputation factors for the associated Internet resource comprises at least one of: plurality of run-time behaviors, script block count, picture count, immediate redirect and response latency.

21. The system of claim 18, further comprising:
weighting each of the plurality of reputation factors.

22. The system of claim 18, wherein the MED classifier is created for the local area network.

23. The system of claim 18, wherein the first Internet resource comprises a Uniform Resource Identifier.

24. The system of claim 18, further comprising
transmitting the calculated reputation index score to the security appliance that is part of the local area network.

25. The system of claim 18, wherein the plurality of reputation factors for the associated Internet resource comprises a number of hosts factor for the associated Internet resource and the plurality of obtained factors for the first Internet resource comprises a number of hosts factor for the first Internet resource.

26. The system of claim 18, wherein the plurality of reputation factors for the associated Internet resource comprises a latency factor for the associated Internet resource and the plurality of obtained factors for the first Internet resource comprises a latency factor for the first Internet resource.

27. A method for classifying an Internet resource, the method comprising:
performing a predictive security assessment of an internet resource, by a reputation generating site, based on known facts about the Internet resource, the performing the predictive security assessment further comprising:
- accessing, at the reputation generating site, one or more HyperText Markup Language (HTML) documents of the Internet resource;
- obtaining a plurality of reputation factors of the one or more HTML documents of the Internet resource, the plurality of reputation factors of the one or more HTML documents including a virtual hosting factor for the Internet resource, a time known for the Internet resource and a classification age of the Internet resource, the virtual hosting factor for the Internet resource indicating whether other authorities than a first authority associated with the Internet resource share an IP address associated with the first authority, the time known for the Internet resource indicating how long the Internet resource has been known to the reputation generating site and the classification age indicating how long the Internet resource has held a reputation classification assigned by the reputation generating site;
- weighting each of the plurality of reputation factors of the one or more HTML documents based on empirical knowledge of each of the plurality of reputation factors;
- analyzing, at the reputation generating site, a reputation vector of the Internet resource, the reputation vector based on the plurality of reputation factors;
- using a trained classifier to calculate, at the reputation generating site, a calculated reputation index score for the Internet resource using, as input to the trained classifier, the reputation vector based on the plurality of reputation factors, including the virtual hosting factor for the Internet resource, the time known for the Internet resource and the classification age of the Internet resource; and
- storing, in a data store at the reputation generating site, the calculated reputation index score for the Internet resource;

transmitting the calculated reputation index score to a local area network of a security appliance;
at the local area network, controlling access to the internet resource, the controlling access further comprising:
- receiving, by the security appliance, a request for the Internet resource from a client device over the local area network;
- accessing, by the security appliance, the calculated reputation index score;
- comparing the calculated reputation index score to a security policy of the local area network, wherein the security policy comprises a threshold reputation index score for denying access to Internet resources established for the local area network; and
- based on results of the comparison, either permitting or denying access to the Internet resource.

28. The method of claim 27, wherein the plurality of reputation factors of the one or more HTML documents comprises a number of hosts factor for the Internet resource.

29. The method of claim 27, wherein the plurality of reputation factors of the one or more HTML documents comprises a latency factor for the Internet resource.

\* \* \* \* \*